(12) United States Patent
Shimizu et al.

(10) Patent No.: US 10,107,232 B2
(45) Date of Patent: Oct. 23, 2018

(54) METHOD FOR DRIVING INTERNAL COMBUSTION ENGINE, AND AIR SUPPLY DEVICE

(71) Applicant: Asahi Kasei Chemicals Corporation, Tokyo (JP)

(72) Inventors: Atsushi Shimizu, Tokyo (JP); Hirokazu Ohno, Tokyo (JP); Tomohiro Niihama, Tokyo (JP); Masahiro Tsukamoto, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 286 days.

(21) Appl. No.: 14/431,850

(22) PCT Filed: Sep. 26, 2013

(86) PCT No.: PCT/JP2013/076105
§ 371 (c)(1),
(2) Date: Mar. 27, 2015

(87) PCT Pub. No.: WO2014/050986
PCT Pub. Date: Apr. 3, 2014

(65) Prior Publication Data
US 2015/0285190 A1    Oct. 8, 2015

(30) Foreign Application Priority Data

Sep. 28, 2012 (JP) .................................. 2012-217815
May 9, 2013 (JP) .................................. 2013-099738

(51) Int. Cl.
*F02M 23/02* (2006.01)
*F02M 25/022* (2006.01)
(Continued)

(52) U.S. Cl.
CPC ......... *F02M 25/0228* (2013.01); *B01D 61/00* (2013.01); *B01D 63/02* (2013.01);
(Continued)

(58) Field of Classification Search
CPC .. F02M 25/032; F02M 25/0228; B01D 61/00; B01D 63/14; F02B 33/34
See application file for complete search history.

(56) References Cited

U.S. PATENT DOCUMENTS 5,051,113 A    9/1991  Nemser
5,147,417 A    9/1992  Nemser
(Continued)

FOREIGN PATENT DOCUMENTS

CN    1643244 A      7/2005
CN    102449297 A    5/2012
(Continued)

OTHER PUBLICATIONS

Search Report issued in counterpart European Patent Application No. 13840438.9 dated Jul. 6, 2015.
(Continued)

*Primary Examiner* — Kevin A Lathers
(74) *Attorney, Agent, or Firm* — Morgan, Lewis & Bockius LLP

(57) ABSTRACT

A method for driving an internal combustion engine is a method for reducing nitrogen oxides in emissions of the internal combustion engine, and includes a process of introducing air, which has a low oxygen concentration and contains no emissions, into the internal combustion engine, and a process of mixing humidifying water with a hydrocarbon fuel and injecting the mixture into a combustion chamber of the internal combustion engine as an emulsion fuel.

25 Claims, 16 Drawing Sheets

(51) Int. Cl.
| | |
|---|---|
| *F02D 23/02* | (2006.01) |
| *F02M 25/032* | (2006.01) |
| *B01D 63/02* | (2006.01) |
| *B01D 63/14* | (2006.01) |
| *F02M 35/10* | (2006.01) |
| *F02M 33/00* | (2006.01) |
| *B01D 61/00* | (2006.01) |
| *F02B 33/34* | (2006.01) |
| *F02B 47/02* | (2006.01) |
| *F02M 25/03* | (2006.01) |
| *B01D 53/22* | (2006.01) |

(52) U.S. Cl.
CPC .............. *B01D 63/14* (2013.01); *F02B 33/34* (2013.01); *F02B 47/02* (2013.01); *F02D 23/02* (2013.01); *F02M 25/0227* (2013.01); *F02M 25/03* (2013.01); *F02M 25/032* (2013.01); *F02M 33/00* (2013.01); *F02M 35/10301* (2013.01); *F02M 35/10334* (2013.01); *B01D 53/22* (2013.01); *B01D 2256/10* (2013.01); *B01D 2257/104* (2013.01); *B01D 2317/022* (2013.01); *B01D 2317/08* (2013.01); *Y02T 10/121* (2013.01); *Y02T 10/144* (2013.01)

(56) References Cited

U.S. PATENT DOCUMENTS

| | | | |
|---|---|---|---|
| 5,649,517 A | 7/1997 | Poola et al. | |
| 2004/0154590 A1* | 8/2004 | Yasui | F02D 11/105 123/399 |
| 2005/0161009 A1* | 7/2005 | Hupli | F02B 47/02 123/25 E |
| 2012/0125286 A1* | 5/2012 | Shimizu | F02M 33/00 123/25 R |
| 2013/0145748 A1 | 6/2013 | Shimizu et al. | |

FOREIGN PATENT DOCUMENTS

| | | |
|---|---|---|
| JP | H03-061658 A | 3/1991 |
| JP | H04-231670 A | 8/1992 |
| JP | 2002-004900 A | 1/2002 |
| JP | 2003-343272 A | 12/2003 |
| JP | 2005-520965 A | 7/2005 |
| JP | 2010-096133 A | 4/2010 |
| WO | 99/042709 A1 | 8/1999 |
| WO | 03/078819 A1 | 9/2003 |
| WO | 2010/137628 A1 | 12/2010 |
| WO | 2012/026472 A1 | 3/2012 |

OTHER PUBLICATIONS

International Search Report issued in corresponding International Patent Application No. PCT/JP2013/076105 dated Dec. 24, 2013.
"Marine Engineering," The Japan Institute of Marine Engineering, 46: 1-54 (2011) (see partial English translation).
"Technical Code (2008) on Control of Emission of Nitrogen Oxides from Marine Diesel Engines," Nippon Kaiji Kyokai, 1-90 (2008) (see partial English translation).
International Preliminary Report on Patentability and Written Opinion issued in corresponding International Patent Application No. PCT/JP2013/076105 dated Apr. 9, 2015.
"Humidification methods for reduction of NOx emission No. 112," CIMAC Congress, 1-18 (2004).

* cited by examiner

US 10,107,232 B2

METHOD FOR DRIVING INTERNAL COMBUSTION ENGINE, AND AIR SUPPLY DEVICE

TECHNICAL FIELD

The present invention relates to a method for driving an internal combustion engine and an air supply device, and more particularly to a method for driving an internal combustion engine, capable of reducing nitrogen oxides in emissions of the internal combustion engine, and an air supply device.

BACKGROUND ART

Internal combustion engines represented by, for instance, a diesel engine are used in various fields because of their high combustion efficiency and low generation of carbon dioxide. However, because of emissions of internal combustion engines contain nitrogen oxides (hereinafter referred to as "NOx"), and because of recent increases in environmental consciousness, NOx emission control has a tendency to be strengthened.

NOx emitted from a marine diesel engine is scheduled for Tier III controls starting in 2016 by the International Maritime Organization (IMO). Under such Tier III controls, NOx will be required to be reduced 75% from values of Tier II controls currently in effect. For this reason, development of NOx removal technology that is highly effective and inexpensive is required, and various investigations about the reduction of NOx are being performed (see Non-Patent Literature 1).

A specific example of NOx reduction technology based on emission after-treatment includes selective catalytic reduction (SCR) technology for selectively reducing NOx in emissions of a diesel engine using a catalyst (see Non-Patent Literature 1). However, the SCR technology requires chemicals such as urea or ammonia to reduce NOx, and has a challenge in the management of the chemicals or excessive costs. Further, when the SCR technology is applied to emissions having a high concentration of NOx from several hundreds to thousands of ppm, increase in size of the device is also expected to be a problem.

As a specific example of NOx reduction technology based on combustion control, a method of supplying supply air that has been humidified by spraying water to an internal combustion engine and reducing NOx is proposed (see Non-Patent Literature 2). In this method, a concentration of oxygen in the supply air can be efficiently reduced using an effect of diluting water vapor. However, since a pressure of the water vapor is a function of only a temperature, when a supercharging pressure is increased at the same temperature, there is a drawback that an amount of humidification is relatively reduced. Further, if a temperature of the supply air is increased too much in order to increase the amount of humidification, a problem of reduction of fuel efficiency may occur.

As another method of controlling combustion using water vapor, a method of transferring the water vapor from emissions to supply air using a water vapor permeable membrane is proposed (Patent Literature 1). In this method, since an amount of the transferred water vapor is small, there is a drawback that a NOx reduction effect is low.

In addition, a method of reducing NOx using a membrane is proposed. For example, it is described in Patent Literature 2 that a concentration of nitrogen in the air is enriched using an oxygen permselective membrane, and the nitrogen-enriched air is supplied to an internal combustion engine to reduce NOx.

Furthermore, a method of adding water to fuel and supplying the emulsion to an engine, or directly injecting water into an engine cylinder is also proposed (Non-Patent Literature 1). This method has an advantage in that a NOx reduction effect according to water per unit weight is high. However, NOx cannot be reduced up to a Tier III level by this method alone.

Further, a technique (exhaust gas reduction (EGR)) for causing some emissions to circulate in supply air, and reducing a concentration of oxygen in the supply air in order to reduce NOx in the emissions has been developed (Non-Patent Literature 1). The emissions contain SOx that is generated by oxidation of sulfur in the fuel, and becomes sulfuric acid when absorbed into water in the emissions. In EGR, to avoid sulfuric acid corrosion of a machine pipe at a portion at which the emissions circulate, a desulfurization or scrubber waste water treatment facility based on a water scrubber of the emissions is required. For this reason, the device is complicated, and there is a problem in the aspects of initial device expenses, operating costs, and maintenance costs.

CITATION LIST

Patent Literature

[Patent Literature 1] Japanese Unexamined Patent Application, First Publication No. H03-061658
[Patent Literature 2] Japanese Unexamined Patent Application, First Publication No. H04-231670

Non-Patent Literature

[Non-Patent Literature 1] Marine Engineering, Vol 46, No. 6, 2011, pp 1-54.
[Non-Patent Literature 2] J. Hupli, "Humidification method for reduction of NOx emission", CIMAC Congress, 2004, No. 11

SUMMARY OF INVENTION

Technical Problem

The present invention has been made in view of the aforementioned problems, and an object of the present invention is to provide a method for driving an internal combustion engine, capable of reducing nitrogen oxides in emissions of the internal combustion engine, and an air supply device.

Solution to Problem

The inventors have repeated intensive studies to address these problems. As a result, the inventors have found that, in comparison with the related art, drastic reduction of NOx is possible by introducing air that has a low concentration of oxygen and contains no emissions into an internal combustion engine and injecting an emulsion fuel obtained by mixing water with a hydrocarbon fuel into a combustion chamber of the internal combustion engine, and thereby completing the prevent invention.

That is, the present invention is as follows.

[1] There is provided a method for driving an internal combustion engine that burns a hydrocarbon fuel and air in a combustion chamber. In the method, the air contains no emissions of the internal combustion engine. The method includes an oxygen concentration reducing process of reducing a concentration of oxygen in the air introduced into the combustion chamber, and a process of injecting a hydrocarbon fuel and water into the combustion chamber.

[2] In the method for driving an internal combustion engine described in [1], the process of injecting a hydrocarbon fuel and water into the combustion chamber is a process of mixing the water with the hydrocarbon fuel and injecting the mixture into the combustion chamber as an emulsion.

[3] In the method for driving an internal combustion engine described in [1] or [2], the oxygen concentration reducing process includes an air pressurizing process of pressurizing the air to make pressurized air, and a process of bringing the pressurized air into contact with one surface of a gas permeable membrane to reduce a concentration of oxygen in the pressurized air.

[4] In the method for driving an internal combustion engine described in [3], the oxygen concentration reducing process includes a water vapor adding process of bringing humidifying water for humidifying the pressurized air into contact with the other surface of the gas permeable membrane to add water vapor to the pressurized air.

[5] In the method for driving an internal combustion engine described in [1] or [2], the oxygen concentration reducing process includes a water vapor adding process of adding water vapor to the air to reduce the concentration of oxygen in the air.

[6] In the method for driving an internal combustion engine described in [5], the water vapor adding process includes an air pressurizing process of pressurizing the air to make pressurized air, and a process of bringing the pressurized air into contact with one surface of a water vapor permeable membrane, and bringing the humidifying water into contact with the other surface of the water vapor permeable membrane to add water vapor to the pressurized air.

[7] In the method for driving an internal combustion engine described in [3] or [4], the gas permeable membrane is a gas permeable membrane that exhibits gas separation performance through dissolution and diffusion of a gas.

[8] In the method for driving an internal combustion engine described in [6], the water vapor permeable membrane is a gas permeable membrane that exhibits gas separation performance through dissolution and diffusion of a gas.

[9] In the method for driving an internal combustion engine described in [6], the water vapor permeable membrane is a hydrophobic microporous membrane.

[10] In the method for driving an internal combustion engine described in any one of [1] to [9], the concentration of oxygen in the air in the oxygen concentration reducing process is 10 mol % or more and 20.5 mol % or less.

[11] In the method for driving an internal combustion engine described in [4] or [6], the humidifying water contains an electrolyte.

[12] In the method for driving an internal combustion engine described in [4] or [6], the humidifying water contains sodium chloride

[13] In the method for driving an internal combustion engine described in [4] or [6], a temperature of the humidifying water is 20° C. or more and 95° C. or less.

[14] In the method for driving an internal combustion engine described in [4] or [6], the humidifying water is used by circulation.

[15] In the method for driving an internal combustion engine described in any one of [4] to [6], a content of water in the humidified air is 1 mol % or more, and humidity of the humidified air is less than 100% RH.

[16] In the method for driving an internal combustion engine described in [3], [4], or [6], the air in the air pressurizing process is compressed by a supercharger attached to the internal combustion engine, and is additionally compressed by a compressor disposed in series with the supercharger.

[17] In the method for driving an internal combustion engine described in [3], [4], or [6], the air in the air pressurizing process is air including air pressurized by a supercharger attached to the internal combustion engine and air pressurized by a compressor disposed in parallel with the supercharger.

[18] There is provided a method for driving an internal combustion engine that burns a hydrocarbon fuel and air in a combustion chamber. The method includes: pressurizing the air using a supercharger attached to the internal combustion engine; compressing the air pressurized by the supercharger using a compressor disposed in series with the supercharger or adding air pressurized by a compressor disposed in parallel with the supercharger to the air pressurized by the supercharger; and introducing low oxygen concentration air, which is obtained by bringing the pressurized air into contact with one surface of a gas permeable membrane to remove a predetermined amount of oxygen from the air, into the internal combustion engine.

[19] There is provided an air supply device for an internal combustion engine equipped with a supercharger, an air compressor, and an oxygen concentration reduction module, wherein: the oxygen concentration reduction module includes a gas permeable membrane and a case in which the gas permeable membrane is housed; and the supercharger, the air compressor, and the oxygen concentration reduction module are connected in series.

[20] There is provided an air supply device for an internal combustion engine equipped with a supercharger, an air compressor, and an oxygen concentration reduction module, wherein: the oxygen concentration reduction module includes a gas permeable membrane and a case in which the gas permeable membrane is housed; and the supercharger and the oxygen concentration reduction module are connected in series, and the air compressor is connected in parallel with the supercharger between the supercharger and the oxygen concentration reduction module.

[21] There is provided an air supply device for an internal combustion engine equipped with a supercharger and an oxygen concentration reduction module, wherein: the oxygen concentration reduction module includes a gas permeable membrane and a case in which the gas permeable membrane is housed; and the oxygen concentration reduction module and the supercharger are connected in series.

[22] In the air supply device described in any one of [19] to [21], the gas permeable membrane is a water vapor permeable membrane.

[23] In the air supply device described in any one of [19] to [22], the gas permeable membrane is a hollow fiber membrane or a flat membrane.

[24] In the method for driving an internal combustion engine described in [1] or [2], the air in which the concentration of oxygen is reduced in the oxygen concentration reducing process is supplied to a supercharger of the internal combustion engine.

[25] In the method for driving an internal combustion engine described in [1] or [2], a total pressure of one surface side of a gas permeable membrane is reduced by a pressure reducing means so as to have a lower pressure than the other surface side, in the oxygen concentration reducing process.

[26] In the method for driving an internal combustion engine described in [3], [4], [7], [18], or [25], a side that is oxygen-enriched by the gas permeable membrane is swept by flowing a gas.

[27] In the air supply device described in [21], the air supply device includes a pressure increasing means upstream from the oxygen concentration reduction module.

[28] In the air supply device described in any one of [19] to [21], the air supply device includes a pressure reducing means for reducing a pressure such that a total pressure of an oxygen-enriched side of the gas permeable membrane is lower than a total pressure of a nitrogen-enriched side of the gas permeable membrane.

[29] In the air supply device described in any one of [19] to [21], an oxygen-enriched side of the gas permeable membrane is swept by flowing a gas.

[30] In the method for driving an internal combustion engine described in [2], the emulsion contains no emulsifier Advantageous Effects of Invention According to the method for driving an internal combustion engine according to the present invention, NOx in the emissions of the internal combustion engine can be reduced.

DESCRIPTION OF EMBODIMENTS

Figure 1:
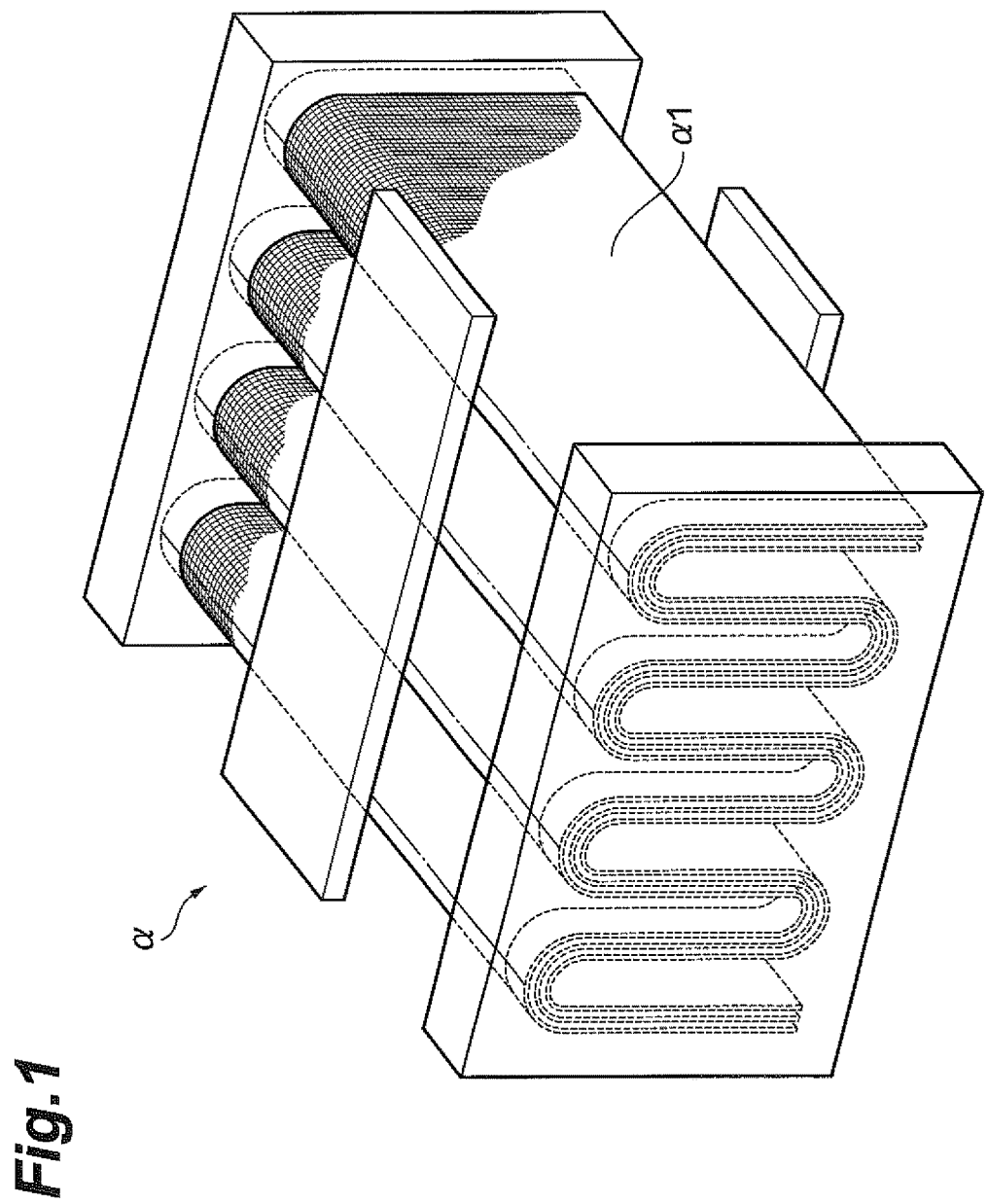
FIG. 1 is a perspective view of an example of a membrane module of the present embodiment.

Hereinafter, a mode for carrying out the present invention (hereinafter referred to simply as "present embodiment") will be described in detail with reference to the drawings as needed. The present embodiment below is an illustrative example for describing the present invention, and the present invention is not intended to be limited to the following contents. Further, the attached drawings illustrate an example of the embodiment, and the embodiment should not be interpreted as being limited to this example. The present invention may be implemented with appropriate modification within the gist thereof. Note that positional relationships such as top, bottom, left, right, or the like shall be based on a positional relationship illustrated in the drawings unless otherwise mentioned and that the dimensional ratios of the drawings are not limited to the ratios illustrated. Further, throughout the drawings, the same reference signs shall be used to denote the same or equivalent portions The present embodiment is a method for driving an internal combustion engine that burns a hydrocarbon fuel and air in a combustion chamber, and the method includes an oxygen concentration reducing process of reducing a concentration of oxygen of the air that does not contain emissions of the internal combustion engine and is introduced into the combustion chamber, and a process of injecting the hydrocarbon fuel and water into the combustion chamber. The internal combustion engine is not particularly limited in type, and examples thereof may include a gasoline engine, a diesel engine, and a gas engine. Among these, the diesel engine has excellent thermal efficiency, can use various liquid fuels in addition to a general fuel such as light oil or heavy oil, and has high versatility. In the diesel engine, because more oxygen than the fuel is introduced into the combustion chamber, the emissions are abundant in nitrogen oxides (NOx). It is highly important in an environmental aspect to enable content of NOx in the emissions of such a diesel engine to be reduced. An example of the diesel engine may include a 4-stroke high-speed engine, a 4-stroke medium-speed engine, and a 2-stroke low-speed engine. The diesel engine is not particularly limited in its applications, and may include applications as power sources of a ship, a vehicle, a power generator, an aircraft, various heavy machines, and so on.

As the process of injecting the hydrocarbon fuel and the water into the combustion chamber, a method of mixing the water with the hydrocarbon fuel and injecting the mixture into the combustion chamber as an emulsion, or a method of providing the combustion chamber with a water injecting means separate from a fuel injecting means may be exemplified. In the latter method, water is injected toward flames of the combustion chamber. Of these methods, the method of mixing the water with the hydrocarbon fuel and injecting the mixture into the combustion chamber as the emulsion is preferable due to its simplicity.

In the present embodiment, the emulsion is used to indicate a state in which a dispersoid is finely dispersed in a dispersion medium in a droplet shape. This state may contain no emulsifier, and is also used to contain a dispersion. For example, the emulsion is a W/O type emulsion fuel in which water is dispersed in a fuel in a droplet shape. This case also contains a W/O type dispersion with no emulsifier. Meanwhile, an emulsifier-free emulsion is preferable. Particularly, when the emulsion is used with the oxygen concentration reducing process of reducing the concentration of oxygen of the air introduced into the combustion chamber of the internal combustion engine, the emulsion shows an effect of improving fuel efficiency.

From this it can be inferred that, particularly when the concentration of oxygen is reduced by a membrane unlike when the air contains the emissions, under condition that there are few impurities in the combustion chamber but combustion is difficult in a low-oxygen environment, mixture of a flame retardant material such as an emulsifier is likely to increase an adverse effect on combustion deterioration, but an effect of improving the fuel efficiency is increased due to a combination of the water and the emulsion without using the emulsifier.

An amount of the water in the emulsion preferably has a lower limit of water/fuel (weight) of 0.1 or more, preferably 0.2 or more, preferably 0.3 or more, preferably 0.4 or more, preferably 0.5 or more, preferably 0.6 or more, and preferably 0.7 or more, and an upper limit of water/fuel (weight) of 1.2 or less, and preferably 1.0 or less.

The low oxygen concentration air is used as the supply air of the internal combustion engine, and thereby generation of NOx can be reduced. Although effects of the low oxygen concentration air are not known exactly, generation of NOx is predicted to be able to be reduced by (1) to (3) below (but effects of the present embodiment are not limited thereto).

(1) As the air in which the concentration of oxygen is reduced is used, a combustion temperature is lowered enable suppression of the NOx generation.

(2) The water (water vapor) that is a triatomic molecule has relatively high specific heat, and can lower an exothermic temperature during the combustion. Thus, the NOx generation can be suppressed.

(3) As either liquid water of the emulsion fuel injected into the engine cylinder or liquid water directly injected into the combustion chamber lowers an ambient temperature in a heat generating process due to latent heat of vaporization, the combustion temperature is lowered enable suppression of the NOx generation.

The emulsion fuel in the present embodiment is obtained by agitating and mixing the water and the hydrocarbon fuel. A fuel supply device is attached to the internal combustion engine, but the emulsion fuel is prepared just before the fuel supply device. In the case of the diesel engine, a process of preparing the emulsion fuel is performed upstream from a fuel injection pump. The agitation of the hydrocarbon fuel and the water may be performed by a tank type or an in-line type agitator. A type of the agitator capable of easily generate an emulsion is adequately selected in consideration of characteristics of the hydrocarbon fuel, use or disuse of the emulsifier, or a type of the emulsifier, and the magnitude of a shearing force of the agitator is adequately selected according to the generated emulsion. An oil-in-water emulsion or a water-in-oil emulsion may be used. An emulsifier may be used to stabilize the emulsion. A water/hydrocarbon fuel ratio (capacity ratio) is 1/99~90/10 that is a typically used range, preferably 10/90~80/20, more preferably 20/80~70/30, and most preferably 20/80~50/50. In the present specification, the symbol "~" indicates that an upper limit and a lower limit are included.

In the present embodiment, the supply air contains no emissions. Containing no emissions means that a method of attaching a device for mixing the supply air and the emissions to the internal combustion engine, mixing the emissions with the supply air, and reducing a concentration of oxygen in the supply air is not performed. When sulfur is contained in the fuel, SOx derived from the fuel is contained in the emissions. Since the emissions are mixed with the supply air in the EGR, this may be responsible for corrosion of parts of the internal combustion engine, and there is a disadvantage that a desulfurization device is required. When the emissions are not used, an advantage that the supply air of the internal combustion engine is very clean, and the parts of the internal combustion engine are improved in durability and are easy to handle is obtained.

The concentration of oxygen in the low oxygen concentration air is preferably 20.5 mol % or less and 10 mol % or more. When the concentration of oxygen exceeds 20.5 mol %, a large amount of NOx is generated. When the concentration of oxygen is less than 10 mol %, engine output is reduced, and a fuel consumption rate is deteriorated. The concentration of oxygen is more preferably 15 mol % or more, more preferably 16 mol % or more, more preferably 17 mol % or more, more preferably 18 mol % or more, more preferably 18.5 mol % or more, more preferably 19 mol % or more, and most preferably 19.5 mol % or more.

In the oxygen concentration reducing process of the present embodiment, there are two types of methods for adjusting the low oxygen concentration air. The first method is a method of bringing pressurized air into contact with one surface of a gas permeable membrane and removing a predetermined amount of oxygen from the air to adjust the low oxygen concentration air (nitrogen-enriched air), and includes an air pressurizing process of pressurizing the air into pressurized air, and a process of bringing the pressurized air into contact with one surface of the gas permeable membrane and reducing a concentration of oxygen in the pressurized air. The second method is a diluting method of adding (humidifying) water vapor to air, and includes a water vapor adding process of adding the water vapor to the air to reduce a concentration of oxygen in the air. In the present embodiment, these methods are used independently or in combination to adjust the low oxygen concentration air, and the low oxygen concentration air is introduced into the internal combustion engine. A concentration of a component in the air used such as oxygen, nitrogen, water vapor, carbonic acid gas, and carbon monoxide is not particularly limited.

In the first method, the pressurized air is brought into contact with the one surface (primary side) of the gas permeable membrane, and oxygen-enriched air is discharged from the other surface (secondary side) of the gas permeable membrane. Thereby, the nitrogen-enriched air is obtained from the primary side.

The gas permeable membrane used in the first method is a non-porous membrane in which there are substantially no pores through which a gas can permeate such as in Knudsen flow, and is a membrane through which a gas permeates by means of a dissolution-diffusion mechanism. That is, the gas permeable membrane is a membrane showing gas separation performance caused by dissolution and diffusion of the gas. A type of the gas permeable membrane is not particularly limited, and may include an organic polymer or inorganic gas permeable membrane. In the present embodiment, as the gas permeable membrane, one having a ratio of oxygen permeation rate/nitrogen permeation rate greater than 1 is preferable.

The pressurized air is introduced into the non-permeable side (primary side) of the gas permeable membrane used in the first method. For this reason, nitrogen and oxygen partial pressures of the primary side are higher than those of the permeable side (secondary side), and the gas permeates from the primary side to the secondary side using a differential pressure between the sides as a driving force. At this time, since the permeation rate of oxygen is higher than that of nitrogen, the primary side becomes nitrogen-enriched air, and the secondary side becomes oxygen-enriched air. A case in which the pressure of the primary side is higher than that of the secondary side is preferable because the permeation rate of oxygen becomes fast. Further, when the secondary side is scavenged (swept) by the air, the oxygen partial pressure of the secondary side can be lowered. This is preferable because the gas separation performance of the gas separation membrane is improved.

A material of the organic polymer gas permeable membrane may include, for instance, a fluororesin, a polyimide resin, a silicone resin, a TR polymeric resin, a PIMS-based resin, and a PPO-based resin. Among these, the fluororesin and the silicone resin having a great gas permeation coefficient, and the polyimide resin having high gas selectivity are preferable, while the fluororesin is more preferable.

As the fluororesin, an amorphous fluorine-containing polymer is preferably used. Such an amorphous fluorine-containing polymer may include, for instance, a polymer having a fluorine-containing alicyclic structure in a main chain. The polymer having the fluorine-containing alicyclic structure in the main chain is obtained by polymerizing at least one from among: for instance, a monomer having a dioxole ring such as perfluoro(2,2-dimethyl-1,3-dioxole) (PDD), perfluoro(2-methyl-1,3-dioxole), perfluoro(2-ethyl-2-propyl-1,3-dioxole), or perfluoro(2,2-dimethyl-4 methyl-1,3-dioxole); a monomer having a fluorine-containing alicyclic structure such as fluorine, a perfluorodioxole compound having a fluorine-substituted alkyl group such as a trifluoromethyl group, a pentafluorophenyl group, or a heptafluoropropyl group, perfluoro(4-methyl-2-methylene-1,3-dioxolane) (MMD), or perfluoro(2-methyl-1,4-dioxin); and a monomer copolymerizable with these monomers.

As the copolymerizable monomer, a compound in which H atoms of C—H bonds are all substituted with F atoms is preferable. From the viewpoint of improving gas permeability of the fluorine-containing polymer, a percentage of polymerization units of the monomer having the fluorine-containing alicyclic structure in the fluorine-containing polymer is preferably 30 mol % or more. As a result, the monomer has many cyclic structures, a molecular gap is increased, and the gas permeation rate can be further increased.

A radically polymerizable monomer in which the H atoms of the C—H bonds are all substituted with the F atoms (i.e. which contains no C—H bonds) may include tetrafluoroethylene, chlorotrifluoroethylene, perfluoro(methyl vinyl ether), and so on.

An amorphous fluorine-containing polymer containing no C—H bonds may include a copolymer of perfluoro-2,2-dimethyl-1,3-dioxole, tetralluoroethylene and so on. Commercially available products including, for example, the product "Teflon (registered trademark) AF1600" (available from DuPont Co., Ltd.), the product "Teflon (registered trademark) AF2400" (available from DuPont Co., Ltd.), the product "HYFLON AD" (available from Ausimont Co., Ltd.), Cytop (available from Asahi Glass Co., Ltd.), and so on may also be used.

The gas permeable membrane (which may hereinafter simply be referred to generically as a "membrane") may be a structure in which a thin membrane having gas permeability is formed on a support layer. A function of maintaining membrane strength and a function of separating a gas are separated from each other, and thereby mechanical strength of the membrane is improved, and the gas permeation rate can be improved. A material of the support layer is not particularly limited as long as it is a material having fine through-holes, and an organic or inorganic microporous membrane may be used. For example, a woven fabric, a non-woven fabric, or a microporous membrane may be used. Among these, the microporous membrane is preferable. The microporous membrane may include a polyimide microporous membrane, a PVDF microporous membrane, a PTFE microporous membrane, a polyolefin microporous membrane, a polysulfone microporous membrane used as an ultrafiltration membrane (UF membrane), a polyethersulfone microporous membrane, a polyacrylonitrile microporous membrane, and so on. Microporous membranes may have pores of a symmetric structure or pores of an asymmetric structure, and either of these may be used.

As a method of forming pores in an organic material, a method based on a wet phase separation method or a dry method (e.g. a lamellar pore opening method or an interfacial peeling method) is exemplified.

A resin thin membrane having gas separability is formed on one or both surfaces of a support. In the case of a hollow fiber membrane, a form in which a membrane is formed on an inner or outer surface of the hollow fiber membrane that is a support layer may also be used.

The inorganic gas permeable membrane may include a silicone-nitride-based or carbon-based gas permeable membrane. The inorganic gas permeable membrane may include a membrane in which a gas permeable membrane is formed on a ceramic membrane that is a support layer by hydrothermal synthesis, or a membrane in which a thin membrane is formed by chemical vapor deposition (CVD).

As the method of adding the water vapor to (humidifying) the air, i.e., the second method for obtaining the low oxygen concentration air, a method of spraying water, a method of introducing steam, or a membrane humidifying method may be exemplified. Among these, the membrane humidifying method in which an evaporation surface area of the water is wide and humidification can be efficiently performed is preferable. As the membrane humidifying method, a method using a porous membrane wetted by water, a method using a water vapor permeable membrane, and a method using a gas permeable membrane may be exemplified.

In the membrane humidifying method, the water vapor permeable membrane having a property of being permeated by the water vapor without being permeated by the liquid humidifying water may be used. A structure or material of the membrane is not particularly limited, and a suitable structure or material may be appropriately selected depending on applications or usage environments. The water vapor permeable membrane is a non-porous membrane in which there are substantially no pores through which a gas can permeate such as in Knudsen flow. A membrane through which a gas permeates by means of a dissolution-diffusion mechanism, a hydrophilic membrane, or a hydrophobic microporous membrane may be used. The hydrophilic membrane can be humidified in such a way that the liquid water that is the liquid is present in the membrane and is evaporated. In the hydrophobic microporous membrane, gaseous water permeates into the pores, but the liquid water cannot permeate into the pores. A type of the water vapor permeable membrane is not particularly limited, and may include an organic polymer or inorganic gas permeable membrane. To be specific, the material of the gas permeable membrane in the first method may be used, and the gas permeable membrane described in the first method in which the material of the gas permeable membrane is formed on the support in the thin membrane may be used. Further, as the membrane in which the water is contained, a membrane having an ionic group may also be used, and an ion exchange resin membrane may be exemplified.

The hydrophobic microporous membrane refers to a membrane through which the liquid water does not permeate but the water vapor permeates. Here, the hydrophobicity indicates that a water absorption rate as a polymer is 0.5 mass % or less. The water absorption rate is preferably 0.1 mass % or less, more preferably 0.05 mass % or less, and most preferably 0.01 mass % or less. Here, the water absorption rate as the polymer can be measured by methods that will be described below in Examples.

A type of the hydrophobic microporous membrane is not particularly limited, and an organic or inorganic microporous membrane may be used. The type of the hydrophobic microporous membrane is not particularly limited, and may include, for instance, a fluororesin microporous membrane. A polyvinylidene fluoride (PVDF) microporous membrane, a polytetrafluoroethylene (PTFE) microporous membrane, a polyimide microporous membrane, a polyolefin microporous membrane, a polysulfone microporous membrane, a polyethersulfone microporous membrane, or a polyacrylonitrile microporous membrane may be used. Further, a non-woven fabric or a woven fabric may also be used. A fluorine microporous membrane is preferable because of its strong hydrophobicity. Even in other microporous membranes, a process of increasing the hydrophobicity of a surface is preferably performed.

As the method of forming the pores in the organic material, the method based on the wet phase separation method or the dry method (e.g. the lamellar pore opening method or the interfacial peeling method) is exemplified.

In the humidification caused by the water vapor permeable membrane, the low oxygen concentration air (humidified air) is obtained by bringing the air into contact with one surface of the water vapor permeable membrane, causing the water (humidifying water) to flow along the other surface of the water vapor permeable membrane, and adding a predetermined amount of water vapor to the air to dilute the air. A water vapor pressure is a function of only a temperature, and is not dependent upon a total pressure of a system. Thus, when the total pressure of the system is lower, a diluting effect of the air caused by the water vapor is higher. When the temperature of the air is higher, the diluting effect of the air caused by the water vapor is higher. A water contact angle of the surface of the water vapor permeable membrane and a membrane on which nitrogen enrichment and humidification to be described below are performed at the same time is preferably 90° or more, more preferably 95° or more, and most preferably 100° or more.

The humidifying water flows to a counter side (secondary side) across the membrane along with a humidified gas of the water vapor permeable membrane. Only the water vapor is added at a humidified side (primary side) by intermediation of the membrane. From the viewpoint of preventing the humidified air from undergoing dew condensation due to a slight change in temperature, humidity of the air of the humidified side is preferably less than 100% RH, and more preferably equal to or less than 95% RH. A temperature and flow rate of the humidifying water poured to the secondary side are controlled, and thereby the humidity of the air humidified through the water vapor permeable membrane can be controlled with high precision. When a flow of the air of the primary side and a flow of the air of the secondary side are used as extrusion flows, the primary side flow and the secondary side flow are preferably used as counter flows. In place of the humidifying water, the water vapor may also be used.

In the present embodiment, the humidifying water is not particularly limited, and may be pure water, clean water, or recycled water. The humidifying water may contain ions or fine particles as impurities. The humidifying water used in the present embodiment can obtain an excellent humidifying effect even when it contains an electrolyte. For example, the humidifying water can obtain an excellent humidifying effect even when it is humidifying water (e.g., sea water) containing sodium chloride. Particularly, in the water vapor permeable membrane using an organic polymer having no ionic functional group, these impurities can be effectively inhibited from leaking out to an air supply side, and thus cleaner humidification is possible.

As a prior art method of humidifying the supply air of the internal combustion engine, a scavenge air moisturizing (SAM) method is known. This method is a method used to reduce nitrogen oxides emitted from a marine diesel engine, and is a method of humidifying supply air through a desalination process of humidifying the supply air with sea water, treating the supply air with fresh water, and removing seawater mist contained in the supply air. When desalination is not completely performed, salt enters the internal combustion engine, and causes problems in the internal combustion engine. Thus, it is necessary to carefully perform the desalination. In the method of the present embodiment, water vapor is added by the water vapor permeable membrane, and thereby the air is diluted, and a concentration of oxygen is reduced. The membrane humidifying method is characterized in that, since no mist is scattered, very clean humidification can be performed regardless of dissolved components such as salt contained in the humidifying water. Accordingly, the desalinating process of the air after the humidification is not required. Due to the clean humidification, the reliability of the engine is improved, and problems in the engine are prevented.

In the present embodiment, the humidifying water (also containing the water vapor) is poured along the water vapor permeable membrane, and humidifies the air. Thus, the flow rate and temperature of the humidifying water are controlled according to the performance of each of the aforementioned water vapor permeable membranes, and thereby the humidification of the air can be easily adjusted.

A state of the humidifying water used in the present embodiment is not particularly limited, and may be a liquid or a gas (water vapor). As the water vapor is used, the humidification can be performed without reducing nitrogen enriching ability of the nitrogen-enriched membrane and the humidification nitrogen-enriched membrane.

When the humidifying water is the water vapor, another material may be combined as a carrier as needed. Particularly, the air is preferably combined as the carrier. As the carrier is used, a flow rate or temperature of the water vapor can be more accurately controlled. The emissions of the internal combustion engine may be used as the carrier. Further, a multiphase flow of the air and the humidifying water may be poured to the secondary side of the membrane.

When the humidification is performed through the water vapor permeable membrane, a direction in which the air flows and a direction in which the humidifying water flows are not particularly limited. A direction in which the humidified air flows and a direction in which the humidifying water or the water vapor flows preferably face each other across the membrane. As both flow in opposite directions, the humidification can be efficiently performed.

In the membrane humidifying method, a relation between a pressure of the air (air pressure) and a pressure of the humidifying water (water pressure) is not particularly limited. When only the humidification is performed, the humidifying water is preferably pressurized at a higher pressure than the pressurized air. That is, it is preferable to maintain a pressure that is equal to or more than the air pressure of the humidified side and to pour the humidifying water. This makes it easy to humidify the pressurized air. Further, as the pressure of the humidifying water is set to be equal to or higher than the pressure of the humidified side, the air of the humidified side can be prevented from escaping through the water vapor permeable membrane, and a loss of an amount of the air and a loss of energy can be suppressed. When the nitrogen enrichment and the humidification are performed at the same time, the pressure of the secondary side is preferably lower than the pressure of the primary side.

At the time of the humidification, latent heat of vaporization of the humidifying water needs to be supplied, but sensible heat of the humidifying water poured to the secondary side (humidifying water side) of the membrane is preferably used. In this case, the sensible heat corresponding to the supplied latent heat of vaporization is decided according to a temperature difference between an inlet and an outlet of a humidification device and an amount of circulation of the humidifying water. Further, the humidity and temperature of the air can be easily controlled according to the temperature difference and the amount of circulation. A temperature of the poured humidifying water is preferably 20° C. or more and 95° C. or less. As the temperature of the poured humidifying water is set to such a temperature range, the air can be more efficiently humidified, which is more effective in reducing NOx. Further, the temperature of the air supplied and pressurized is preferably set to a range from −10° C. to +50° C.

In the present embodiment, it is possible to obtain the humidified air having a humidity of 50% RH or more. The humidity of the humidified air is more preferably 80% RH or more, and most preferably 90% RH or more. When the air having such humidity is used to drive the internal combustion engine, a content of NOx in the emissions of the internal combustion engine can be drastically reduced. Further, the humidity of the humidified air is preferably in a range in which dew condensation does not occur. The humidity is preferably less than 100% RH, and more preferably 95% RH or less. Thereby, it is possible to prevent the humidified air from undergoing the dew condensation due to a slight change in temperature.

In the method for driving the internal combustion engine of the present embodiment, a content of water in the humidified air is preferably 1 mol % or more. As an amount of water molecules in the humidified air increases, this is preferable because the NOx generation can be suppressed in the internal combustion engine. The amount of water molecules is more preferably 3 mol % or more, more preferably 6 mol % or more, more preferably 9 mol % or more, and most preferably 10 mol % or more.

In the present embodiment, the humidifying water is preferably circulated and used. A circulating mode is not particularly limited. For example, as the humidifying water flowing along a surface of the water vapor permeable membrane is heated and then poured along the surface of the water vapor permeable membrane again, it is preferable to circulate the humidifying water. This is preferable from the viewpoint of economy because it is possible to save water.

In the method of the present embodiment, the oxygen in the air is reduced by the nitrogen enrichment and/or the humidification. In a method of reducing the oxygen in the air, only the nitrogen enrichment may be used, only the humidification may be used, or both may be used. When both are used, a method of humidifying the nitrogen-enriched air, a method of nitrogen-enriching the humidified air, and a method of performing humidification at the same time as nitrogen enrichment may be exemplified. When the nitrogen enrichment and the humidification are performed at the same time, they can be performed by using the gas permeable membrane and the water vapor permeable membrane as the same membrane. Treated air is poured to the primary side of the gas permeable membrane, and heated humidifying water or a water-air multiphase flow is poured to the secondary side of the membrane. Thereby, the nitrogen enrichment and the humidification are possible at the same time.

When the nitrogen enrichment and the humidification are simultaneously performed, there is an advantage that working processes can be reduced and carried out with a simple structure of the device. The gas permeable membrane used at this time is a membrane which selectively permeates oxygen and has a high water vapor permeation rate and in which permeation of a gas is performed by dissolution and diffusion. As this gas permeable membrane, the non-porous membrane that is illustrated as the first method of adjusting the aforementioned low oxygen concentration air and exhibits the gas separation performance caused by the dissolution and diffusion of the gas may be used.

When the nitrogen enrichment and the humidification are simultaneously performed, the pressure of the primary side (humidified side) and the pressure of the secondary side (gas permeable side) are not particularly limited, but the pressure of the secondary side is preferably equal to or lower than that of the primary side. Thereby, the oxygen can easily permeate. The pressure of the secondary side is preferably close to, or equal to or less than atmospheric pressure.

When the nitrogen enrichment and the humidification are simultaneously performed, the flow of the air of the primary side and the flow of the air or the humidifying water of the secondary side are opposite to each other, which is preferable because the nitrogen enrichment and the humidification can be efficiently performed.

A preferable range of the humidity is as mentioned above in the humidification method.

In addition, the foregoing in the method for driving the internal combustion engine by performing the humidification are true to the temperature, the flow rate, or the circulation of the humidifying water or the water vapor. Especially, even when the humidification and the nitrogen enrichment are performed, the humidifying water or the water vapor is poured, and thereby the temperature and the humidity of the pressurized air can be easily controlled.

In the present embodiment, the pressurized air is preferably air that is compressed by a supercharger attached to the internal combustion engine and then is compressed by a compressor disposed in series with the supercharger again. The supercharger is a device used to recover energy of an exhaust gas that is frequently used, particularly, in a diesel engine. A method of directly connecting a turbine and a compressor, rotating the turbine with energy of an exhaust gas, and compressing supply air by means of the compressor, and a method of driving a compressor using shaft power of an engine and compressing supply air are representative.

In the gas permeable membrane, oxygen-enriched air is discharged from the secondary side outside the system. At this rate, however, an amount of the supply air is reduced, and thus an amount of the exhaust gas is also reduced. To maintain the amount of the emissions for rotating the turbine of the supercharger, the pressure and amount of the air are increased by the compressor disposed in series with the supercharger, which is preferable in that the fuel efficiency of a heat engine is not deteriorated. In this case, the compressor functions as a booster. Electricity, emissions of the internal combustion engine, shaft power of the internal combustion engine may be used as power of the compressor. In the case of the electricity, use of an electric motor may be given as an example. In the case of the emissions of the internal combustion engine, use of the supercharger may be given as an example. In the case of the shaft power of the internal combustion engine, a mechanical method may be given as an example.

As a separate method for maintaining the amount of the emissions for rotating the turbine of the supercharger, the pressurized air is air obtained by adding air compressed by a compressor disposed in parallel with the supercharger to air compressed by a supercharger attached to the internal combustion engine, which is also preferable in that the fuel efficiency of the heat engine is not deteriorated.

As another separate method, the air is also preferably air that is compressed in the air pressurizing process by the supercharger having a mechanism supplying power to a shaft of the supercharger attached to the internal combustion engine. In this mechanism, a method of connecting an electric motor to the shaft of the supercharger and supplying power, a method of supplying some of the shaft power of the internal combustion engine to the shaft of the supercharger by means of an oil pressure, or a method of mechanically supplying some of the shaft power of the internal combustion engine to the shaft of the supercharger may be exemplified. Due to this method, even when the amount of the emissions is insufficient, a compressing ability of the supercharger can be improved.

In the present embodiment, even when the air is compressed by the supercharger attached to the internal combustion engine and then is compressed by the compressor disposed in series with the supercharger again, the air compressed in these two steps is brought into contact with the one surface of the gas permeable membrane, and the low oxygen concentration air (nitrogen-enriched air) obtained by removing a predetermined amount of oxygen from the contact air is introduced into the internal combustion engine, the nitrogen oxides can be efficiently reduced. The compressor of the second step can function as a booster and compensate for an amount of the oxygen-enriched air discharged outside the system in the nitrogen enriching process to some extent, and the deterioration of the fuel efficiency can be suppressed.

Further, in the present embodiment, even when the air is compressed by the supercharger attached to the internal combustion engine, the air obtained by adding the air compressed by the compressor disposed in parallel with the supercharger to the air compressed by the supercharger is brought into contact with the one surface of the gas permeable membrane, and the low oxygen concentration air (nitrogen-enriched air) obtained by removing a predetermined amount of oxygen from the contact air is introduced into the internal combustion engine, the nitrogen oxides can be efficiently reduced.

Furthermore, in the present embodiment, the low oxygen concentration air from which a predetermined amount of oxygen is removed by the gas permeable membrane may be adapted to be supplied to a suction side of the supercharger. In this case, an outlet (nitrogen-enriched air outlet) of the air side (primary side) having the low oxygen concentration by means of the gas permeable membrane is connected to the suction side of the supercharger. An inlet of the primary side (supply air side toward the gas permeable membrane) may be released to the atmosphere (atmospheric pressure), and additionally equipped with a pressure increasing means such as a compressor. In this case, the pressure increasing means is disposed upstream from a membrane module (oxygen concentration reduction module).

When the gas permeable membrane is installed at either of the suction side and the discharge side of the supercharger, if the nitrogen-enriched membrane is used as the gas permeable membrane, the secondary side of the nitrogen-enriched membrane is configured such that an oxygen partial pressure thereof is lower than that of the primary side. To be specific, the secondary side of the nitrogen-enriched membrane may be decompressed by a pressure reducing means such as a vacuum pump or a suction blower such that the total pressure of the secondary side has a lower pressure than the primary side. Further, a method of causing the air or the mixed gas having the low oxygen concentration to flow to the secondary side and sweeping the secondary side may be used.

When the humidification membrane is used, it may be used by itself, or in combination with the nitrogen-enriched membrane. When combined with the nitrogen-enriched membrane, the humidification membrane is preferably installed downstream from the nitrogen-enriched membrane.

Furthermore, another method of reducing the nitrogen oxides of the internal combustion engine of the present embodiment is a method of reducing the nitrogen oxides in the exhaust gas of the internal combustion engine, and includes a process of bringing air at or below atmospheric pressure into contact with one surface of a water vapor permeable membrane, pouring water along the other surface of the water vapor permeable membrane, and humidifying the air (humidifying process), and a process of introducing the humidified air into the internal combustion engine (introducing process). As the air introduced into the internal combustion engine is humidified, the nitrogen oxides generated from the internal combustion engine during combustion can be reduced.

The humidified air is used as supply air of the internal combustion engine, and thereby the generation of NOx can be reduced. Although effects of the humidified air are not known exactly, the generation of NOx is expected to be able to be reduced by (1) to (3) below (but effects of the present embodiment are not limited thereto).

(1) As the water vapor is contained in the air used for the combustion, a concentration of oxygen in the air is reduced to suppress a combustion reaction, and thereby a combustion temperature can be lowered. For this reason, it is possible to suppress a side reaction in which NOx is generated.

(2) The water that is a triatomic molecule has a relatively high specific heat, and can lower an exothermic temperature during the combustion. For this reason, it is possible to suppress the side reaction by which NOx is generated.

(3) The specific heat of the working fluid used in the internal combustion engine is increased, so that the temperature during the combustion is reduced, and the pressure during the compression is reduced. However, since a compression pressure before ignition is reduced, fuel consumption is not increased, and the deterioration of fuel efficiency can be suppressed.

First, in the method of reducing the nitrogen oxides of the internal combustion engine of the present embodiment, the process (humidifying process) of bringing the air at or below atmospheric pressure into contact with the one surface of the water vapor permeable membrane, pouring the water along the other surface of the water vapor permeable membrane, and humidifying the air is performed.

In the present embodiment, the air at or below atmospheric pressure is used. The air at or below atmospheric pressure is brought into contact with the one surface of the water vapor permeable membrane to be described below. Here, as the water flowing on the surface of the opposite side of the water vapor permeable membrane infiltrates from the water vapor permeable membrane, the air is humidified. In the present embodiment, the air at or below atmospheric pressure flows along the surface of the water vapor permeable membrane, and the water is poured along the other surface of the water vapor permeable membrane. Thereby, the air can be sufficiently humidified efficiently while water vapor permeation performance of the membrane is highly maintained. For this reason, in the present embodiment, it is not necessary to pressurize the air intended to perform the humidification and to install an air pressurization device such as a supercharger before the humidifying process. The method of the present embodiment is a simple method, and can sufficiently reduce the generation of NOx.

Further, when the air is humidified using the water vapor permeable membrane, the condition that the pressure of the water is equal to or slightly higher than the pressure of the air is preferably selected. This prevents the air from being lost by permeation into the water side of the water vapor permeable membrane. In the present embodiment, since the air is at or below atmospheric pressure without being pressurized, the water (water vapor) can be poured at a lower pressure and be humidified. In the case of the liquid water, the pressure of the poured water can be held down, and the energy or cost required for the pressurization can be suppressed. Further, the water for the humidification may be the water vapor.

Further, since the present embodiment is the method of humidifying the air at or below atmospheric pressure and introducing the humidified air into the internal combustion engine, it is also effective for a natural intake engine in which no air is pressurized or an operation in which the supercharger is not substantially operated with a low load. Furthermore, since the air at or below atmospheric pressure is brought into contact with the water vapor permeable membrane and is humidified, and the water vapor permeable membrane or a device having the water vapor permeable membrane need not be given abnormally high pressure resistance or heat resistance, structures thereof can be simplified. Further, typically, since the periphery of the engine is frequently limited in space, the benefit of making the water vapor permeable membrane or the device having the water vapor permeable membrane compact is very great. Furthermore, there is an advantage that a degree of freedom of selecting a material used in the water vapor permeable membrane or the device having the water vapor permeable membrane is widened.

The pressure of the air may be equal to or less than atmospheric pressure. However, from the viewpoint of reducing the loss of the energy required for the supply air, the pressure of the air is preferably −50 kPaG or more and atmospheric pressure (0 kPaG) or less, more preferably −20 kPaG or more and atmospheric pressure or less, and most preferably −10 kPaG or more and atmospheric pressure or less.

Components in the air used and concentrations thereof are not particularly limited. For example, concentrations of components such as oxygen, nitrogen, carbonic acid gas, and carbon monoxide are not particularly limited, and air whose components are adjusted by mixing the exhaust gas with the atmosphere may also be used.

The method of reducing the nitrogen oxides of the present embodiment makes enables the humidified air to contain no water drops, because the air is humidified through the water vapor permeable membrane. From the viewpoint of preventing the humidified air from undergoing dew condensation due to a slight change in temperature, the humidity of the humidified air is preferably less than 100% RH, and more preferably equal to or less than 95% RH. In the method of reducing the nitrogen oxides of the present embodiment, a temperature and flow rate of the poured water are controlled, and thereby the humidity of the air humidified through the water vapor permeable membrane can be controlled with high precision.

When the oxygen concentration reducing process or the process of injecting the hydrocarbon fuel and the water into the combustion chamber are used independently, the fuel efficiency is raised (deteriorated) together with the reduction of NOx. Even in this case, as in the present invention, as the oxygen concentration reducing process or the process of injecting the hydrocarbon fuel and the water into the combustion chamber are used together, the reduction of NOx is possible without the reduction (deterioration) of the fuel efficiency.

Hereinafter, a membrane module (oxygen concentration reduction module) and an air supply device of the internal combustion engine of the present embodiment will be described.

The membrane module of the present embodiment is a membrane module that has a gas permeable membrane and a case in which the gas permeable membrane is housed. A first space and a second space that are partitioned by the gas permeable membrane are formed in the case, and the case is equipped with an air supply port that supplies air to the first space, an air discharge port that discharges the air from the first space, an air/humidifying water supply port that supplies air and/or humidifying water to the second space, and an air/humidifying water discharge port that discharges the air and/or humidifying water from the second space. Water vapor is also contained in the humidifying water.

The membrane module of the present embodiment is obtained by incorporating and modularizing the gas permeable membrane. The first space of the membrane module has the air supply port that is an opening for supplying air and the air discharge port that is an opening for extracting air low-oxygenated by the gas permeable membrane. The first space is a space in which the aforementioned air flows. The second space of the membrane module has the air/humidifying water supply and discharge ports that are openings for pouring the air and/or humidifying water. The second space is a space in which the air and/or humidifying water flows. The number of each of the openings is not particularly limited, and each opening may be provided in an adequate number in consideration of a usage pattern of the membrane module. The water vapor is also contained in the humidifying water.

A type of the membrane module is not particularly limited, and a hollow fiber membrane module or a flat membrane module may be exemplified. For example, plate & frame and pleated type membrane modules using a flat membrane, a hollow fiber membrane module, or a tubular type membrane module may be exemplified. The pleated type may include a type having a shape in which pleats are stacked in a box, and a type having a shape in which pleats are wound in a cylinder. Further, as the membrane module, a plurality of membrane modules may be coupled and used.

FIG. 1 is a perspective view of an example of the membrane module of the present embodiment. The membrane module α is a membrane module having a shape in which pleats are stacked in a box. A gas permeable membrane α1 has a plurality of wrinkle portions (pleats) that are continuously folded in a bellows shape and are formed with portions of mountain and valley folds overlapping. The gas permeable membrane has a structure in which the mountain and valley folds are repeated at a specific pitch by pleating, and has good efficiency because a contact area can be increased. Here, a case of using the gas permeable membrane α1 is described by way of example. However, a water vapor permeable membrane or a nitrogen-enriched water vapor permeable membrane having both characteristics of nitrogen enrichment and water vapor permeation may be used as α1.

Figure 2:
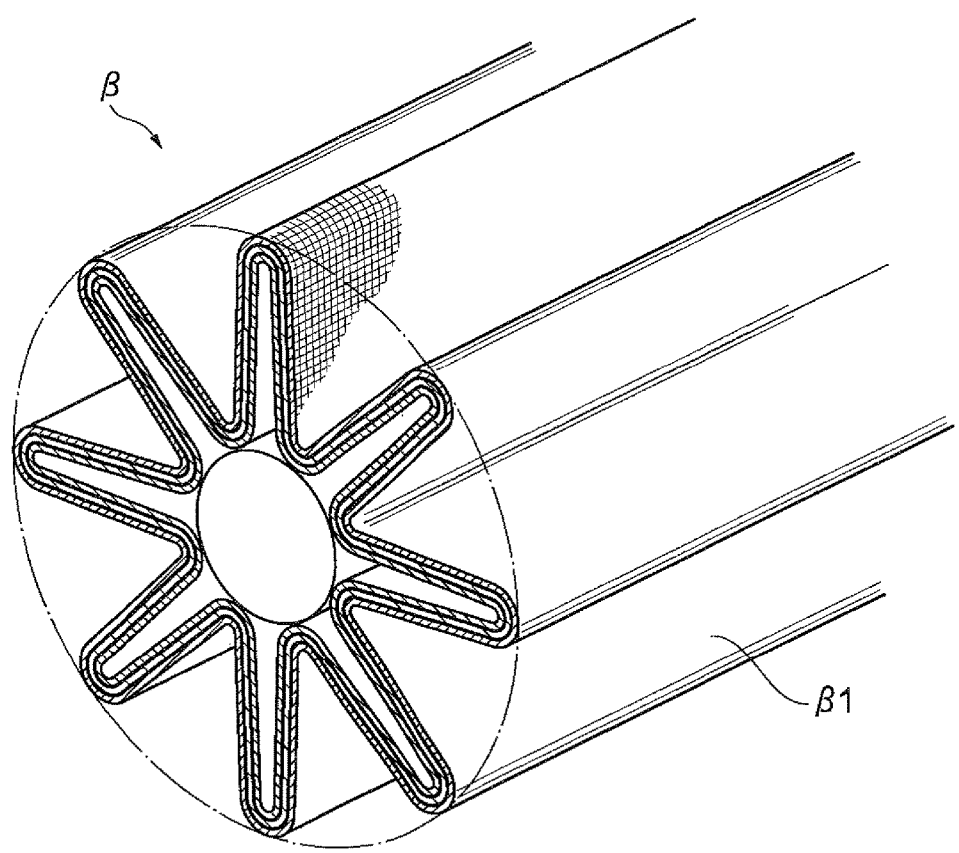
FIG. 2 is a perspective view of another example of the membrane module of the present embodiment.

FIG. 2 is a perspective view of another example of the membrane module of the present embodiment. The membrane module β is a membrane module having a shape in which pleats are wound in a cylinder. Here, a case of using a gas permeable membrane β1 is described by way of example. However, a water vapor permeable membrane or a nitrogen-enriched water vapor permeable membrane having both characteristics of nitrogen enrichment and water vapor permeation may be used as β1.

Figure 3:
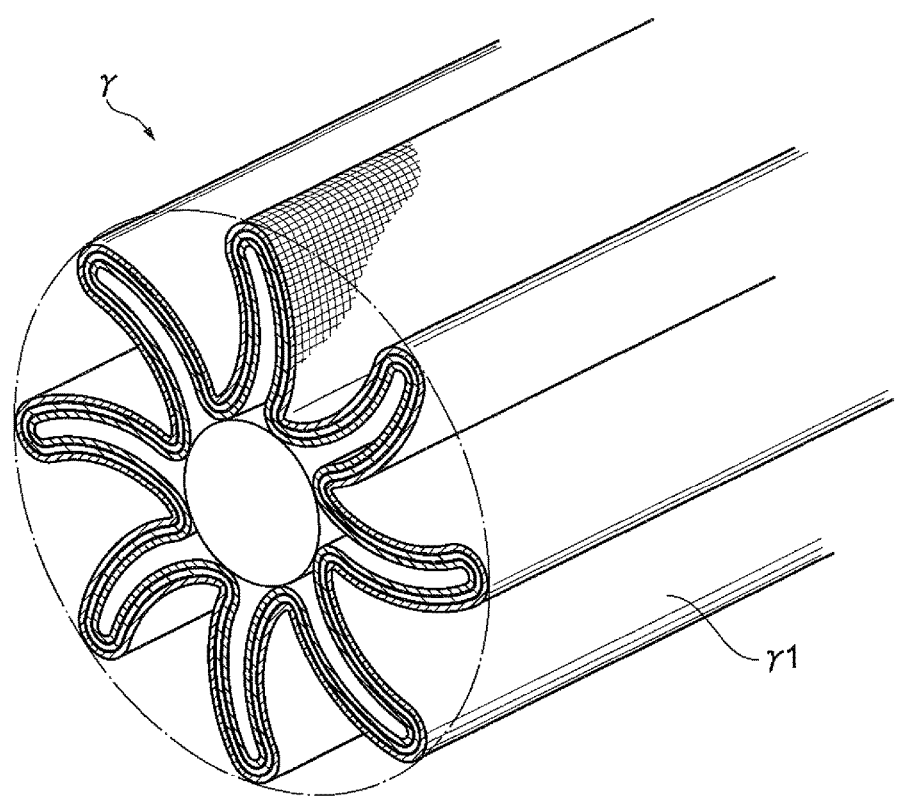
FIG. 3 is a perspective view of yet another example of the membrane module of the present embodiment.

FIG. 3 is a perspective view of another example of the membrane module of the present embodiment. The membrane module γ is a membrane module having a shape (spiral shape) in which pleats are wound in a cylinder and are inclined (twisted) in a counterclockwise direction in a state in which the pleats are viewed from the side with respect to the central axis of the cylinder. Here, a case of using a gas permeable membrane γ1 is described by way of example. However, a water vapor permeable membrane or a nitrogen-enriched water vapor permeable membrane having both characteristics of nitrogen enrichment and water vapor permeation may be used as γ1.

Among the membrane modules above, the hollow fiber membrane module or the pleated type membrane module having a low pressure loss is preferable in terms of the fact that a membrane area (specific surface area) per unit volume is great. The hollow fiber membrane module may be an external pressure type that performs filtration from an outer surface side of a hollow fiber or an internal pressure type that performs filtration from an inner surface side of a hollow fiber. However, the internal pressure type supplying supply air to an inner surface of the hollow fiber is more preferable.

Figure 4:
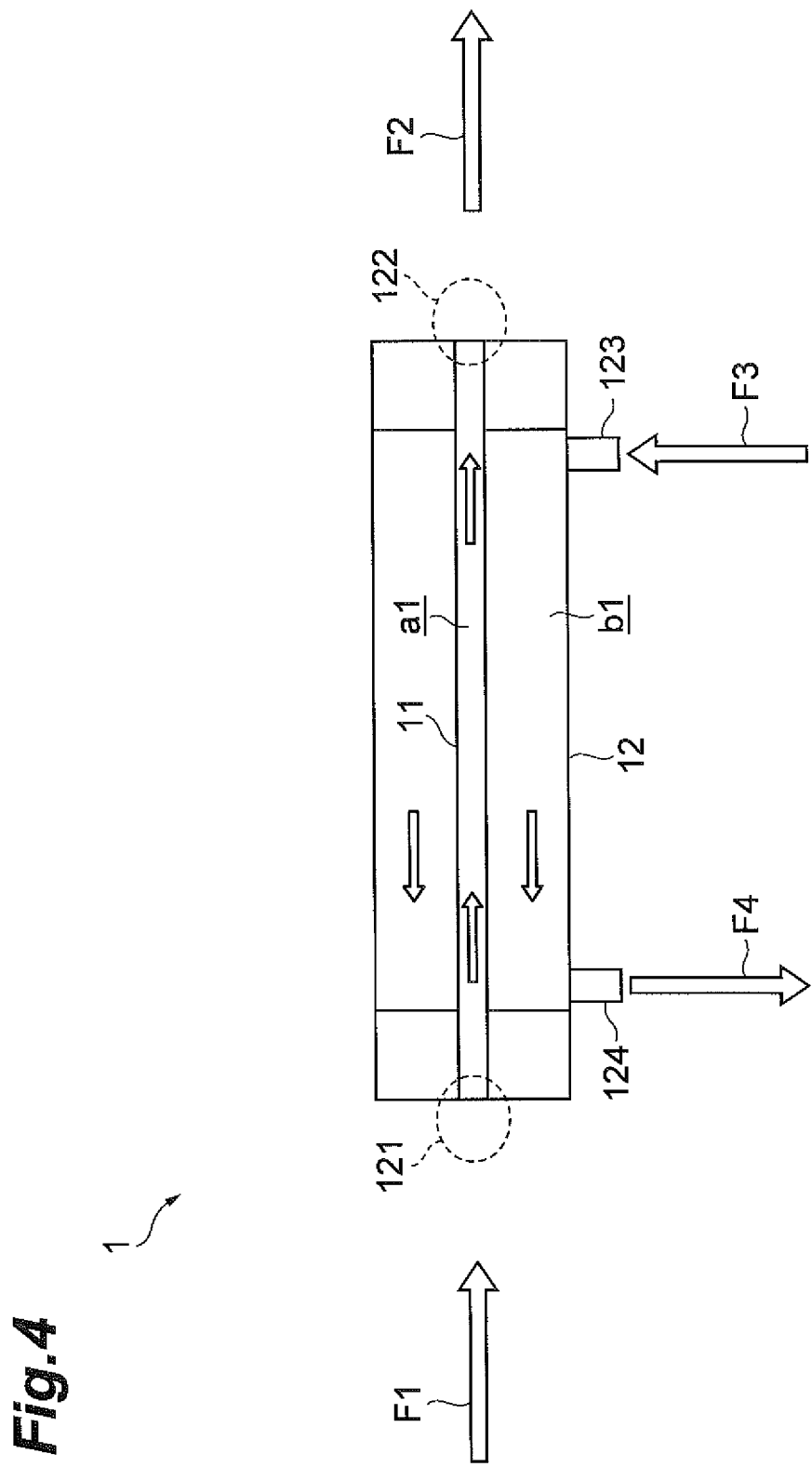
FIG. 4 is a conceptual view of an example of a hollow fiber membrane module used in the present embodiment.

FIG. 4 is a conceptual view of an example of a hollow fiber membrane module used in the method for driving the internal combustion engine of the present embodiment. The membrane module 1 is equipped with a gas permeable membrane 11 and a case 12 in which the gas permeable membrane 11 is housed. The membrane module 1 is a tubular hollow fiber membrane module, and the gas permeable membrane 11 that is the hollow fiber membrane is incorporated therein. The case 12 is equipped with an air supply port 121, an air discharge port 122, an air and/or humidifying water supply port 123, and an air and/or humidifying water discharge port 124. A first space a1 and a second space b1 that are partitioned by the gas permeable membrane 11 are formed in the case 12. In the case of the hollow fiber membrane module, the first space a1 is formed at an inner diameter side (inner side) of the membrane (gas permeable membrane 11), and the second space b1 is formed at an outer diameter side (outer side). The first space a1 is an air region in which air to be treated flows, and the second space b1 is a region in which the air and/or humidifying water flows. Water vapor is also contained in the humidifying water. A water vapor permeable membrane or a nitrogen-enriched water vapor permeable membrane having both characteristics of nitrogen enrichment and water vapor permeation may be used in the hollow fiber.

The air is fed from the air supply port 121 to the gas permeable membrane 11 (see an arrow F1), and low-oxygenated air is discharged from the air discharge port 122 (see an arrow F2). Oxygen-enriched air is discharged from the discharge port 124. In this case, the supply port 123 may also be used as an oxygen-enriched air discharge port. To scavenge the second space b1, the air is introduced from the air supply port 123. When the air is humidified, the humidifying water is supplied from the humidifying water supply port 123 to the second space b1 (see an arrow F3), and is discharged from the humidifying water discharge port 124 to the outside of the case (see an arrow F4). Both the air and the humidifying water may also be introduced from the supply port 123 at the same time. In FIG. 4, a flow in the first space a1 and a flow in the second space b1 are kept opposite to each other. The membrane module 1 has a form in which one each of the air supply port 121, the air discharge port 122, the air and/or humidifying water supply port 123, and the air and/or humidifying water discharge port 124 is provided, but in the present embodiment, the number of each thereof may be two or more as needed. For example, in terms of flow velocity of the air and efficiency of the humidification (and the nitrogen enrichment) of the air, each of the air supply port 121, the air discharge port 122, the air and/or humidifying water supply port 123, and the humidifying water discharge port 124 may also be set to two or more. The water vapor is also contained in the humidifying water. In FIG. 4, one hollow fiber is conceptually described. However, a plurality of hollow fibers are usually bundled and used.

Figure 5:
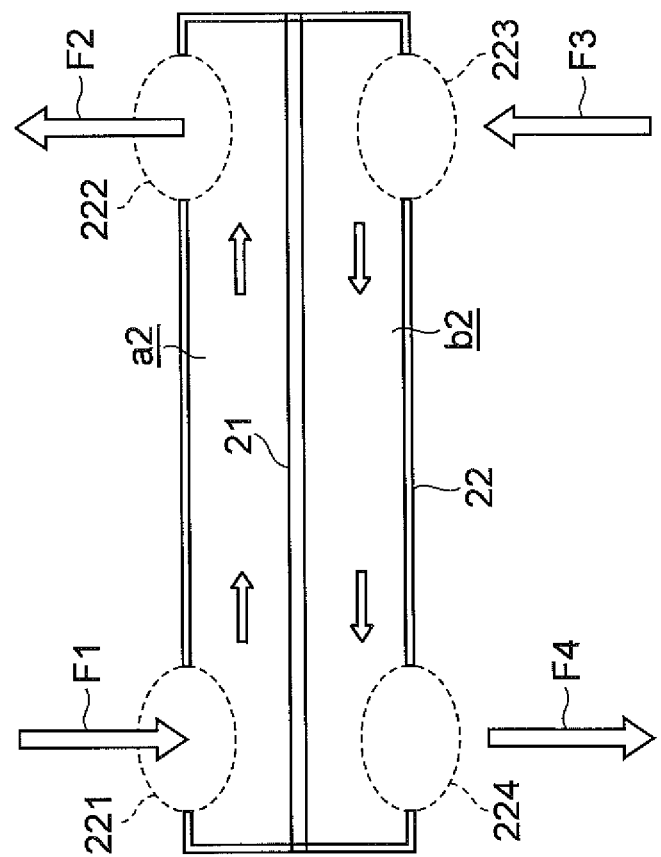
FIG. 5 is a conceptual view of an example of a flat membrane module used in the present embodiment.

FIG. 5 is a conceptual view of an example of a flat membrane module used in the method for driving the internal combustion engine of the present embodiment. Here, items in common with those described in FIG. 4 will not be described, and description will be made centering on points different from those of FIG. 4. The membrane module 2 is equipped with a gas permeable membrane 21 and a case 22 in which the gas permeable membrane 21 is housed. The membrane module 2 is a box-shaped membrane module, and the gas permeable membrane 21 that is a flat membrane is incorporated therein. The case 22 is equipped with an air supply port 221, an air discharge port 222, an air and/or humidifying water supply port 223, and an air and/or humidifying water discharge port 224. The supply port 223 may be used as the oxygen-enriched air discharge port. A first space a2 and a second space b2 that are partitioned by the gas permeable membrane 21 are formed in the case 22. In the case of the box-shaped membrane module, the first space a2 is formed at one surface side (upper side in FIG. 5) of the flat membrane (gas permeable membrane 21), and the second space b2 is formed at the other surface side (lower side in FIG. 5) of the flat membrane. The first space a2 is an air region in which air to be treated flows, and the second space b2 is a humidifying water region in which the air and/or humidifying water flows. A water vapor permeable membrane or a nitrogen-enriched water vapor permeable membrane having both characteristics of nitrogen enrichment and water vapor permeation may be used for the flat membrane.

The air is fed from the air supply port 221 to the gas permeable membrane 21 (see an arrow F1), and low-oxygenated air is discharged from the air discharge port 222 (see an arrow F2). Oxygen-enriched air is discharged from the discharge port 224. In this case, the supply port 223 may also be used as an oxygen-enriched air discharge port. To scavenge the second space b2, the air is introduced from the air supply port 223. When the air is humidified, the humidifying water is supplied from the humidifying water supply port 223 to the second space b2 (see an arrow F3), and is discharged from the humidifying water discharge port 224 to the outside of the case (see an arrow F4). Both the air and the humidifying water may also be introduced from the supply port 223 at the same time. In FIG. 5, a flow in the first space a2 and a flow in the second space b2 are kept opposite to each other.

The air supply device of the internal combustion engine of the present embodiment is equipped with the aforementioned membrane module, an air supply unit that supplies air to the air supply port of the membrane module, and the air and/or humidifying water supply port of the membrane module. A compressor is connected to the air supply port. Low oxygen concentration air discharged from the air discharge port of the membrane module is supplied to the combustion chamber of the internal combustion engine. In the present embodiment, the air subjected to treatment (nitrogen enrichment and humidification) by the membrane module is supplied to the combustion chamber of the internal combustion engine. An emulsion fuel composed of a hydrocarbon fuel and water is supplied to the internal combustion engine, and the internal combustion engine is combined with the low oxygen concentration air supply device of the present embodiment. Thereby, a content of NOx in the emissions discharged from the internal combustion engine can be sharply reduced. Water vapor is also contained in the humidifying water.

In the present embodiment, as described above, the humidifying water may be used even when it contains salts such as sodium chloride or other impurities. Due to this, the present embodiment may also be used in a diesel engine of, for instance, a ship that can easily use seawater.

In the present embodiment, the air compressor connected to the air supply port is used for the purpose of compensating for an amount and pressure by which the low oxygen concentration air decreases due to the oxygen-enriched air discharged outside the system in the nitrogen enriching process. As power of the air compressor, energy such as electricity, shaft power of the engine, or emissions may be used. Further, in the air compressor, ability to compress the air is appropriately selected, and wide selection from a low-pressure blower to a high-pressure compressor is possible. An air suction port of the air compressor has two types, one of which is connected to an air discharge port of the supercharger of the internal combustion engine, and the other of which is open to the atmosphere. In either of these types, it is possible to compensate for a decrease in the pressure of the low oxygen concentration air in the nitrogen enriching process. Thus, it is possible to use a conventional supercharger of an internal combustion engine. An increment of the amount of the air when the air compressor is present is desirably 30% or less compared to that when the air compressor is not present. The increment is preferably 20% or less, and more preferably 10% or less. However, if necessary, the air compressor may be omitted.

In the former case, the supercharger and the air compressor are in a serial connection. In the latter method, since a discharge port of the supercharger and a discharge port of the air compressor are simultaneously connected in the nitrogen enriching process, the supercharger and the air compressor are in a parallel connection. In the case of the serial connection, the air compressed by the supercharger is preferably introduced into the air compressor once it is cooled by an intercooler. The air compressed by the air compressor is introduced into the nitrogen enriching process after being cooled by the intercooler as needed. In the case of the parallel connection, the compressed air from the supercharger and the compressed air from the air compressor join together and are introduced into the nitrogen enriching process. The compressed air discharged from the supercharger and the compressed air discharged from the air compressor are cooled by the intercooler as needed, and then are introduced into the nitrogen enriching process.

As the supercharger of the internal combustion engine, a turbocharger, a supercharger, a Lysholm compressor, or a pressure wave supercharger may be exemplified.

In the present embodiment, when the air is humidified, the humidifying water is supplied to the humidifying water supply port of the membrane module by a water supply unit. As long as the water supply unit can supply the humidifying water to the humidifying water supply port of the membrane module, the water supply unit is not particularly limited, and a known water supply unit may be used. For example, a method of supplying the humidifying water from a water tank to the humidifying water supply port of the membrane module may be exemplified. Further, the humidifying water may also be supplied to the humidifying water supply port by pressurizing the humidifying water. For example, a method of pressurizing the humidifying water and introducing the pressurized humidifying water into the humidifying water supply port may include a method of installing a pressure pump in the front of the humidifying water supply port or in the rear of the humidifying water discharge port and introducing the humidifying water or the water vapor. Further, as the second space (air region) of the aforementioned membrane module is decompressed, the humidifying water is preferably introduced from the humidifying water supply port into the second space. A specific example may include a method of installing a self-contained pump or ejector in the rear of the humidifying water discharge port and introducing the humidifying water into the second space.

In the present embodiment, the method of scavenging the second space of the membrane module with the air is a preferred method because it improves the nitrogen enriching ability of the membrane module. The air and the humidifying water may also be introduced into the second space as a multiphase thereof. According to this method, the nitrogen enrichment and the humidification can be simultaneously performed by the same membrane.

Further, the water supply unit preferably has a liquid delivery unit that supplies the humidifying water, which is discharged from the humidifying water discharge port of the membrane module, to the humidifying water supply port of the membrane module again. This is preferable because it is possible to circulate the humidifying water supplied to the membrane module and to save the water. For example, in the membrane module, at least two openings of the second space are connected to a water tank, and one of the two openings goes through the humidifying water supply device. As a result, it is possible to circulate the humidifying water or the water vapor. In the case of the two openings, a configuration in which one opening is connected to the water tank via the humidifying water supply pump and the other opening is directly connected to the water tank may be exemplified. In the case of a plurality of openings, a configuration in which some openings are connected to the water tank via the humidifying water supply pump, and the other openings are connected to the water tank is exemplified. With this configuration, a path along which the humidifying water or the water vapor is supplied from the water tank to the membrane module via the humidifying water supply device, is discharged from the humidifying water discharge port again, and returns to the water tank can be secured, and thus the humidifying water or the water vapor can circulate. In the case of the water vapor, the emissions may be used as the carrier, and the emissions discharged from the internal combustion engine may be joined to a path through which the water vapor passes.

In the present embodiment, a temperature controller that controls a temperature of the humidifying water, a flow rate controller that controls a flow rate of the humidifying water, or both of these are preferably further provided. The temperature or the flow rate of the humidifying water can be controlled under suitable conditions by the temperature controller or the flow rate controller of the humidifying water which is connected to the water tank or the humidifying water supply device. A device configuration is not particularly limited. For example, a configuration having a humidifying water temperature controller that heats or cools the humidifying water based on a water temperature measured by a water temperature monitor and a flow rate controller that adjusts a flow rate of the humidifying water based on a flow rate measured by a flow rate monitor may be exemplified. The humidifying water is monitored in real time using the water temperature monitor and the flow rate monitor, and thereby the water temperature and the flow rate of the poured humidifying water are preferably controlled automatically. In addition, when the humidifying water is heated, exhaust heat of the internal combustion engine is preferably used. The exhaust heat can be obtained from the emissions or engine oil discharged from the internal combustion engine.

The air supply device of the present embodiment preferably has a heat exchanger. The air sent from the air pressurization device and the humidifying water discharged from the membrane module are heat-exchanged, which is preferable because temperature adjustment can be made, and waste heat can be effectively used.

In the device of the present embodiment, to remove dust from the pressurized air as pretreatment, a prefilter may be provided before the membrane module.

Hereinafter, the air supply device of the internal combustion engine of the present embodiment will be described using the figures.

Figure 6:
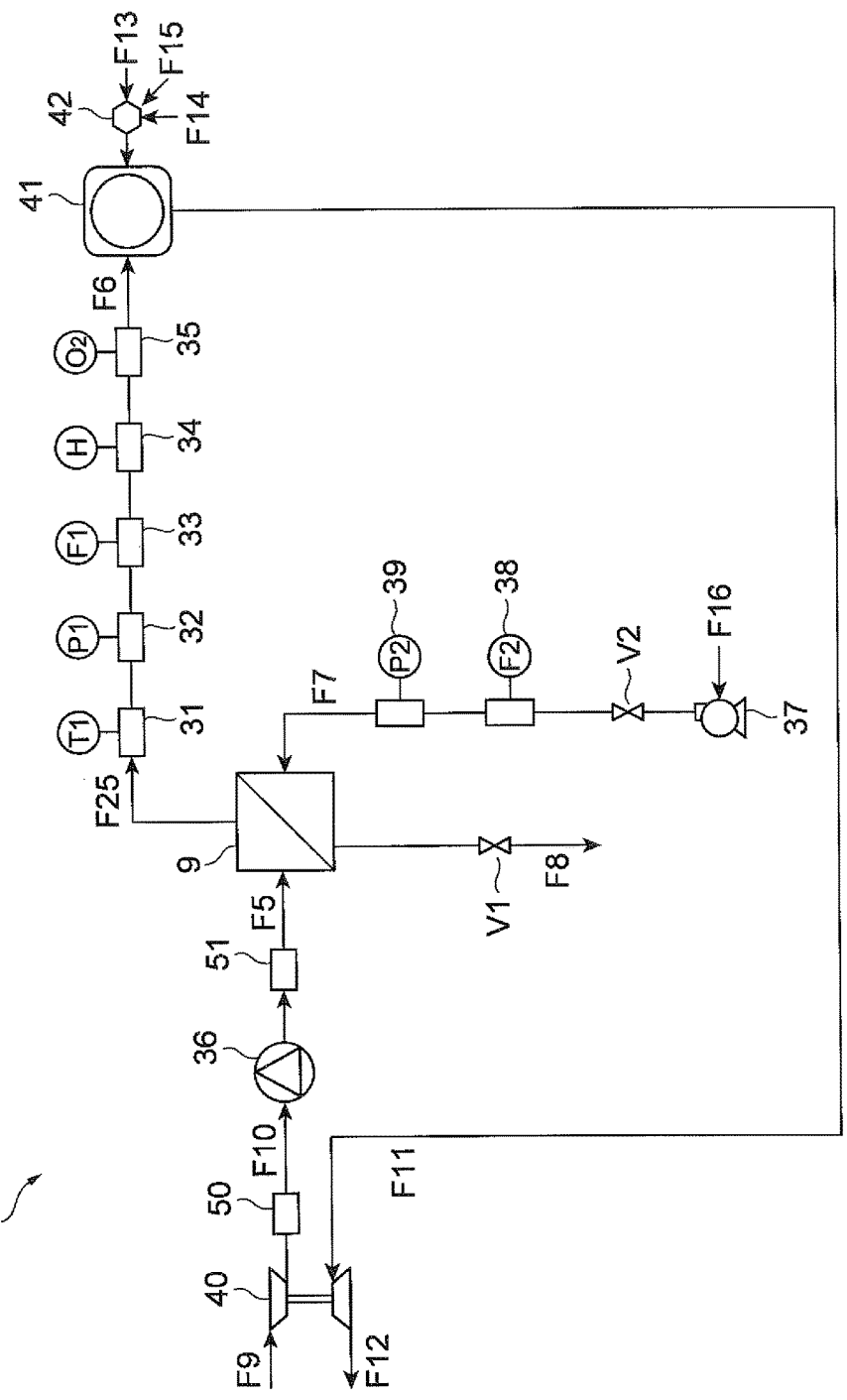
FIG. 6 is a conceptual view of an example of an air supply device for an internal combustion engine of the present embodiment.

FIG. 6 is a conceptual view of an example of the air supply device of the internal combustion engine of the present embodiment. The air supply device 3 has a membrane module 9. A hollow fiber membrane module or a flat membrane module is employed as the membrane module 9. The membrane module 9 is configured in such a way that air compressed by an air compressor 36 is fed from an arrow F5 to an air supply port (see 121 of FIG. 4 or 221 of FIG. 5) thereof, and is discharged from an air discharge port (see 122 of FIG. 4 or 222 of FIG. 5) thereof to an arrow F25. A pressure and a flow rate of the arrow F25 are reduced by oxygen-enriched air that is discharged from a secondary side of the membrane module 9 by an arrow F8. The air compressor 36 is used to increase the pressure and the flow rate of the arrow F25. The compressed air flowing out of the air compressor 36 is cooled by an intercooler 51 as needed.

A thermometer 31, a pressure gauge 32, a flowmeter 33, a hygrometer 34, and an oxygen densitometer 35 are connected to the air discharge port (see 122 of FIG. 4 or 222 of FIG. 5) of the membrane module 9. A flowmeter 38 and a pressure gauge 39 are installed between an air supply blower 37 and the membrane module 9. Air introduced from an arrow F9 is compressed by a supercharger 40, and is introduced into the air compressor 36. In this case, the air is compressed by the supercharger 40 attached to the internal combustion engine, and then is compressed again by the air compressor 36 disposed in series with the supercharger 40.

When air is introduced from F16, air that has a high concentration of oxygen and is collected in the vicinity of the membrane of the secondary side of the membrane module 9 can be forced out (scavenged). Thus, separation performance of the membrane module is improved. In this case, flow directions of the primary and secondary sides of the membrane module 9 are preferably opposite to each other. Even when the air is not introduced from the arrow F16, the air supply device can be used. In this case, the oxygen-enriched air can be discharged from F8, but it may also be discharged against the flow of the arrow F7. A reference number 38 indicates a flowmeter of scavenged gas, and a reference number 39 indicates a pressure gauge of the scavenged gas. Adjustment of an amount of the scavenged gas is controlled by valves V1 and V2.

A fuel indicated by an arrow F13 is introduced into a diesel engine 41 together with humidifying water indicated by an arrow F14 and, if necessary, an emulsifier indicated by an arrow F15 after an emulsion fuel is adjusted by an emulsion producing device 42. An exhaust gas F11 of the diesel engine rotates a turbine of the supercharger 40 to become energy of the compressor, and is discharged by an arrow F12. The compressed air flowing out of the supercharger 40 is cooled by an intercooler 50 as needed. The configuration of the air supply device of the present embodiment is sufficient if it includes the aforementioned configuration, and can be appropriately designed depending on applications or usage environments of the internal combustion engine.

Figure 7:
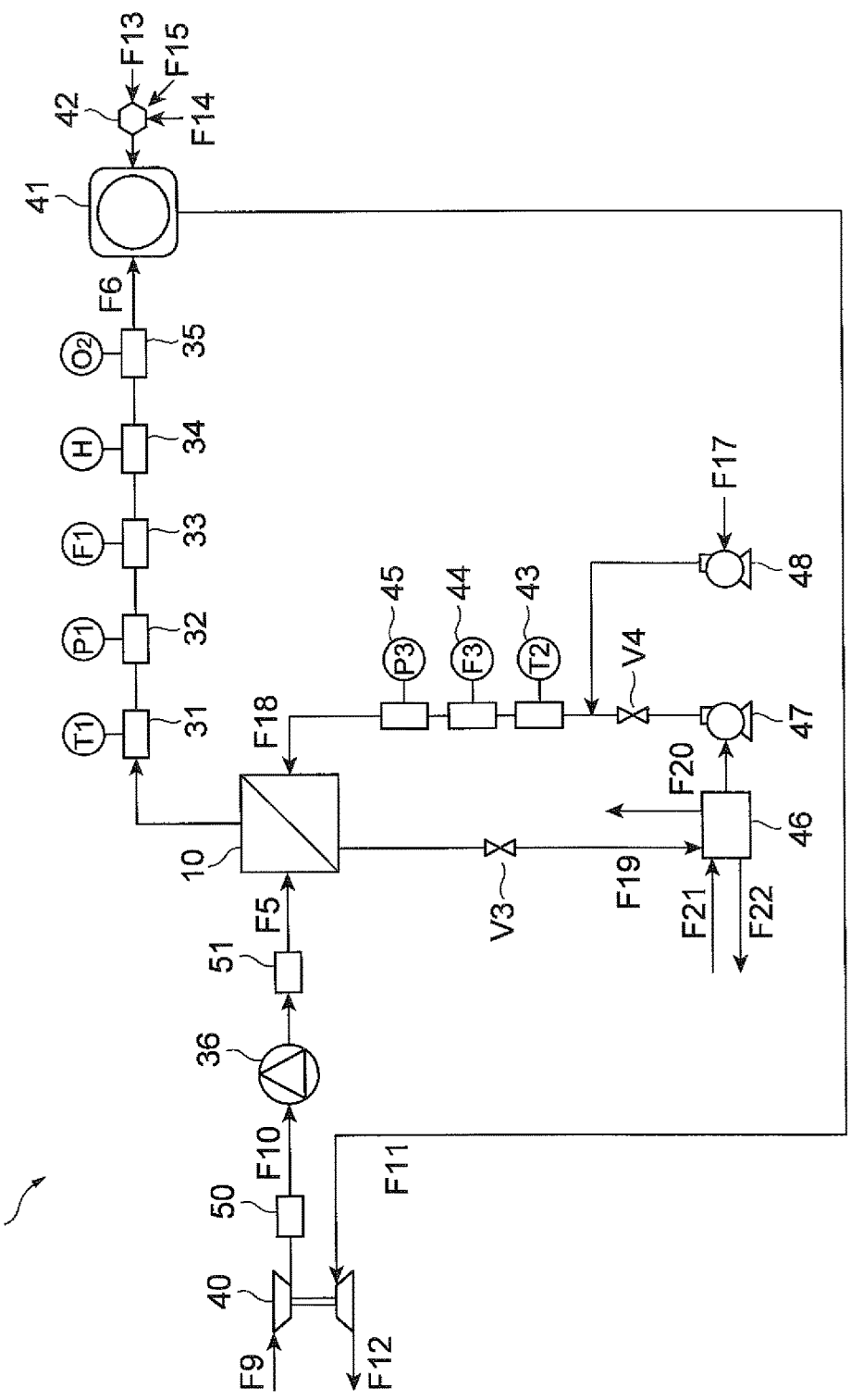
FIG. 7 is a conceptual view of an example of the air supply device for the internal combustion engine of the present embodiment.

FIG. 7 is a conceptual view of another example of the air supply device of the internal combustion engine of the present embodiment. The air supply device 4 has a membrane module 10. A hollow fiber membrane module or a flat membrane module is employed as the membrane module 10. A gas separation membrane or a water vapor permeable membrane is employed as a membrane of the membrane module 10. When the gas separation membrane is used, nitrogen enrichment and humidification can be simultaneously performed. Device symbols and arrow symbols identical to those of FIG. 6 have the same description as in FIG. 6. Humidifying water of a hot water bath 46 is fed to the membrane module 10 by a pump 47. A valve V4, a thermometer 43, a flowmeter 44, and a pressure gauge 45 are installed downstream from the pump 47. The humidifying water is fed from an arrow F18 to a humidifying water supply port (see 123 of FIG. 4 or 223 of FIG. 5) of the membrane module 10. The thermometer 43 and the pressure gauge 45 are connected upstream from the humidifying water supply port (see FIGS. 4 and 5) of the membrane module 10. The humidifying water passes a secondary side of the membrane module 10, and a part thereof is evaporated and transitioned to a primary side of the membrane module 10. The remaining humidifying water returns to the hot water bath 46. As much humidifying water as is evaporated by the membrane module 10 is supplied by an arrow F21. With the circulation of the humidifying water, impurities contained in the humidifying water are accumulated in the hot water bath 46. Thus, a part of the humidifying water is scrapped by an arrow F22 as needed. The nitrogen enrichment and the humidification may also be simultaneously performed by the membrane module 10. The secondary side of the membrane module 10 may also be set as a multiphase flow of the air and the humidifying water. In this case, the air is introduced by an arrow F17, and the humidifying water and the air are mixed above→downstream from the valve V4. The air coming back from the membrane module 10 is scrapped outside a system by an arrow F20.

Flows of first and second spaces (primary and secondary sides) of the membrane module 10 are preferably opposite to each other.

Since a concentration of oxygen and humidity of intake air are optimally controlled depending on a load of the internal combustion engine, a pressure and flow rate of the circulated humidifying water can be controlled by the valves V3 and V4. Alternatively, the pump 47 may also be controlled by an inverter. A temperature of the circulated humidifying water can be controlled by the hot water bath 46.

Next, a device for nitrogen-enriching air, then humidifying the nitrogen-enriched air, and low-oxygenating the humidified air again will be described. As described above, to obtain the low oxygen concentration air subjected to the nitrogen enrichment and the humidification, a case of performing the nitrogen enrichment and the humidification in separate processes and a case of performing the nitrogen enrichment and the humidification in one process may be exemplified. The configuration of the air supply device of the present embodiment is sufficient if it includes the aforementioned configuration, and can be appropriately designed depending on applications or usage environments of the internal combustion engine.

Figure 8:
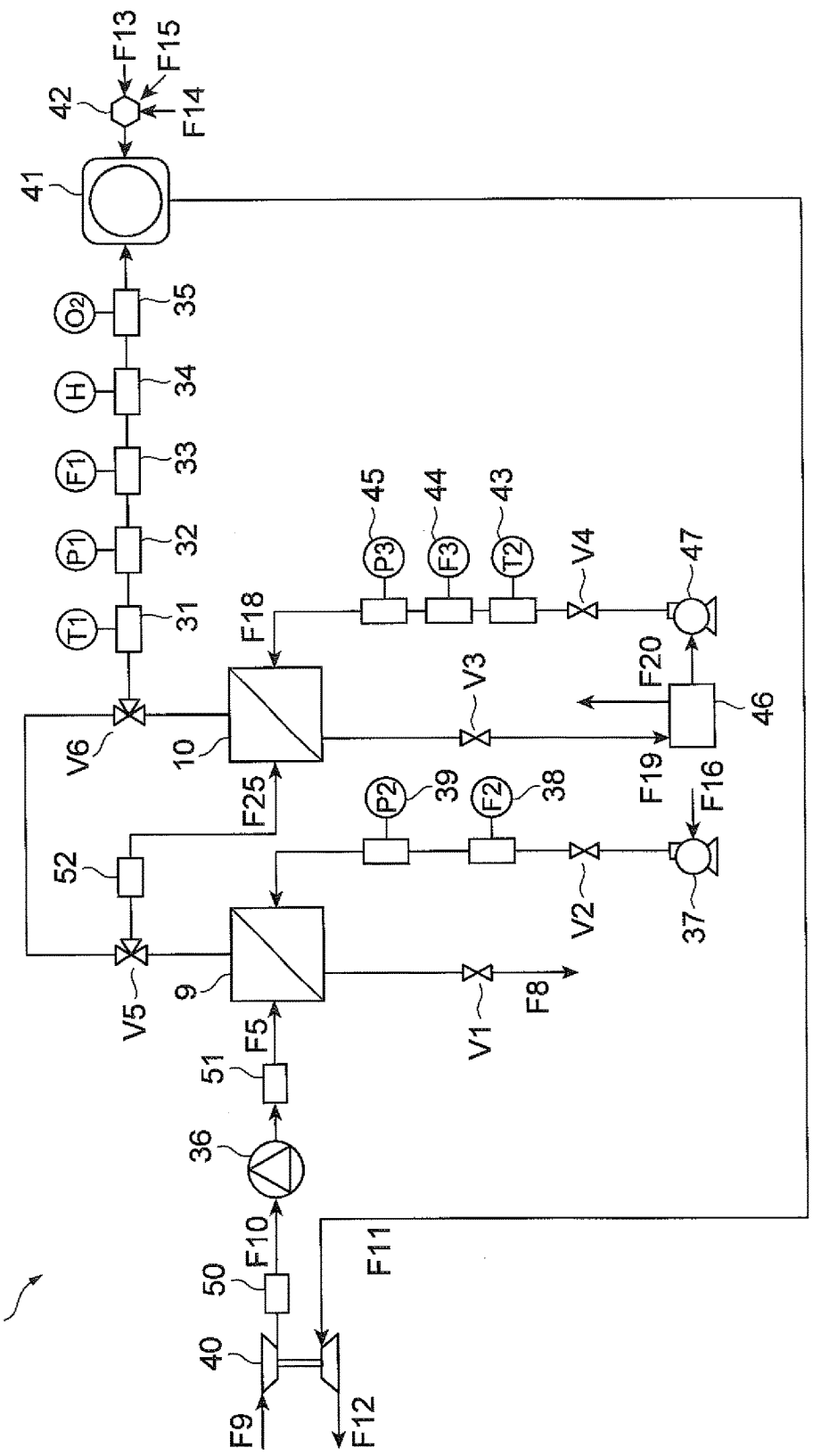
FIG. 8 is a conceptual view of an example of the air supply device for the internal combustion engine of the present embodiment.

FIG. 8 is a conceptual view of another example of the air supply device of the internal combustion engine of the present embodiment. The air supply device 5 is equipped with a first membrane module 9 that mainly performs the nitrogen enrichment on the air, and a second membrane module 10 that mainly performs the humidification on the air. In the membrane module 9, a gas permeable membrane is used. In the membrane module 10, a gas permeable membrane and a water vapor permeable membrane are used. A hollow fiber membrane module or a flat membrane module is employed as each of the membrane modules. Device symbols and arrow symbols identical to those of FIGS. 6 and 7 have the same description as in FIGS. 6 and 7. The air nitrogen-enriched by the membrane module 9 is humidified by the membrane module 10, and the humidified air is additionally low-oxygenated and is introduced into a diesel engine 41. The nitrogen-enriched air flowing out of the membrane module 9 is heated by a heat exchanger 52 as needed, and is introduced into the membrane module 10. The configuration of the air supply device of the present embodiment is sufficient if it includes the aforementioned configuration, and can be appropriately designed depending on applications or usage environments of the internal combustion engine. Symbols V5 and V6 are valves bypassing the membrane module 10.

Figure 9:
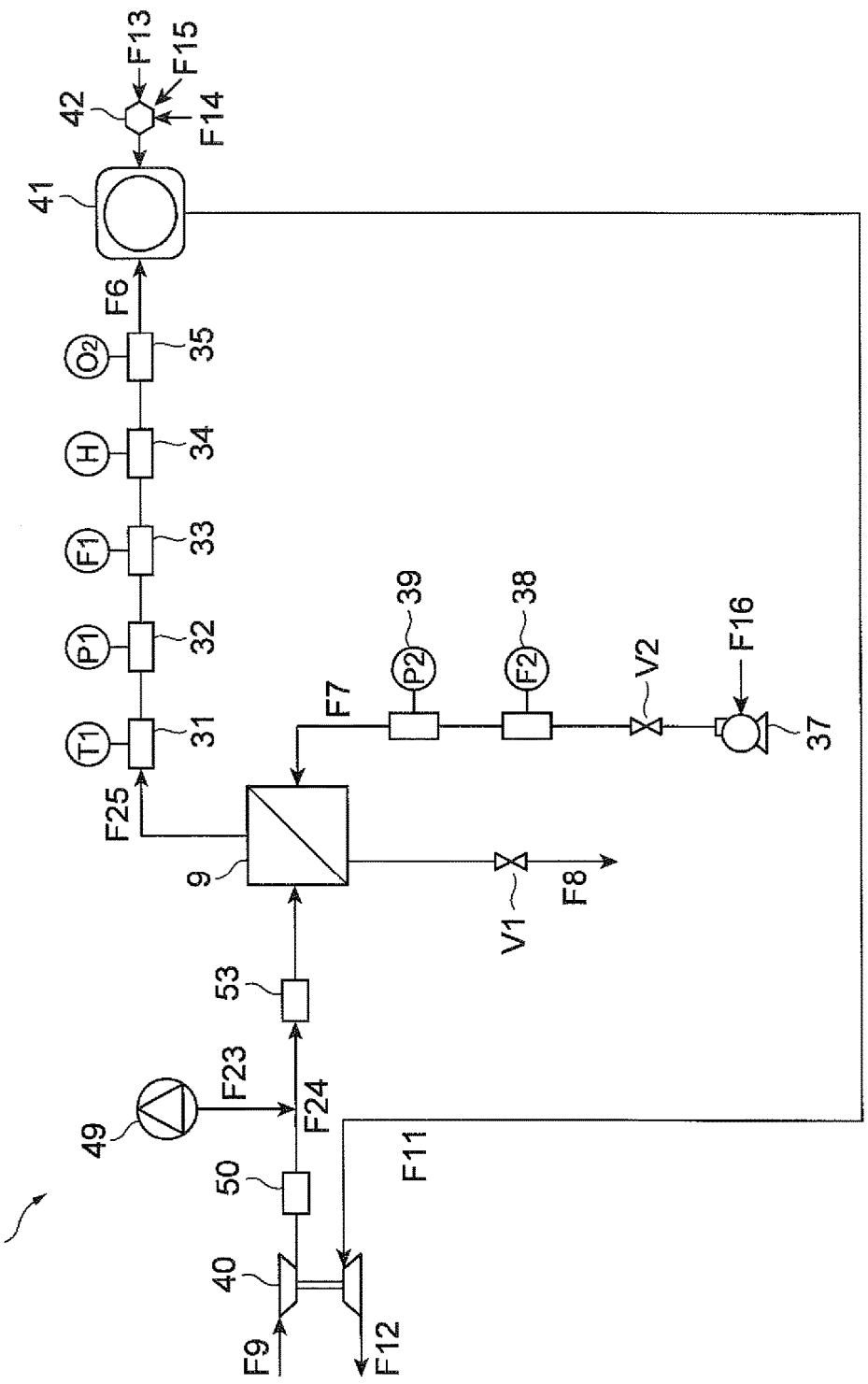
FIG. 9 is a conceptual view of an example of the air supply device for the internal combustion engine of the present embodiment.

FIG. 9 is a conceptual view of another example of the air supply device of the internal combustion engine of the present embodiment. The air supply device 6 has a membrane module 9. A hollow fiber membrane module or a flat membrane module is employed as the membrane module 9. Device symbols and arrow symbols identical to those of FIG. 6 have the same description as in FIG. 6. Air F23 compressed by an air compressor 49 is joined with air F24 compressed by a supercharger 40, and is introduced into the membrane module 9. A pressure and flow rate of an arrow F25 are reduced by oxygen-enriched air discharged from a secondary side of the membrane module 9 by an arrow F8. The air compressor 49 is used to increase the pressure and the flow rate of the arrow F25. The configuration of the air supply device of the present embodiment is sufficient if it includes the aforementioned configuration, and can be appropriately designed depending on applications or usage environments of the internal combustion engine.

Figure 10:
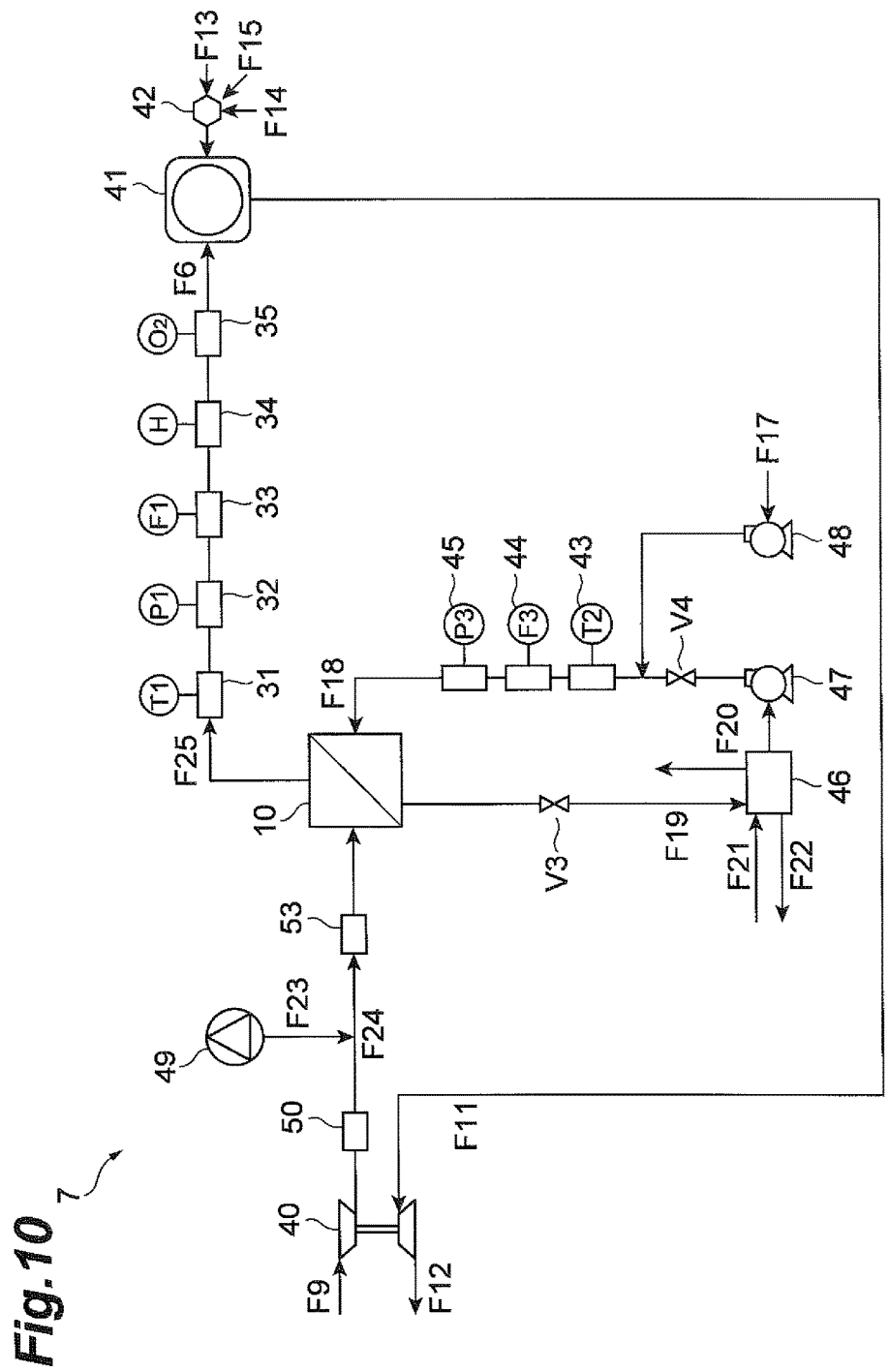
FIG. 10 is a conceptual view of an example of the air supply device for the internal combustion engine of the present embodiment.

FIG. 10 is a conceptual view of another example of the air supply device of the internal combustion engine of the present embodiment. The air supply device 7 has a membrane module 10. A hollow fiber membrane module or a flat membrane module is employed as the membrane module 10. Device symbols and arrow symbols identical to those of FIG. 7 have the same description as in FIG. 7. Air F23 compressed by an air compressor 49 is joined with air F24 compressed by a supercharger 40, and is introduced into the membrane module 10. A pressure and flow rate of an arrow F25 are reduced by oxygen-enriched air discharged from a secondary side of the membrane module 10 by an arrow F19. The air compressor 49 is used to increase the pressure and the flow rate of the arrow F25. The configuration of the air supply device of the present embodiment is sufficient if it includes the aforementioned configuration, and can be appropriately designed depending on applications or usage environments of the internal combustion engine. In this case, air obtained by adding the air compressed by the air compressor 49 disposed in parallel with the supercharger 40 to the air compressed by the supercharger 40 attached to the internal combustion engine is supplied to the membrane module 10.

Figure 11:
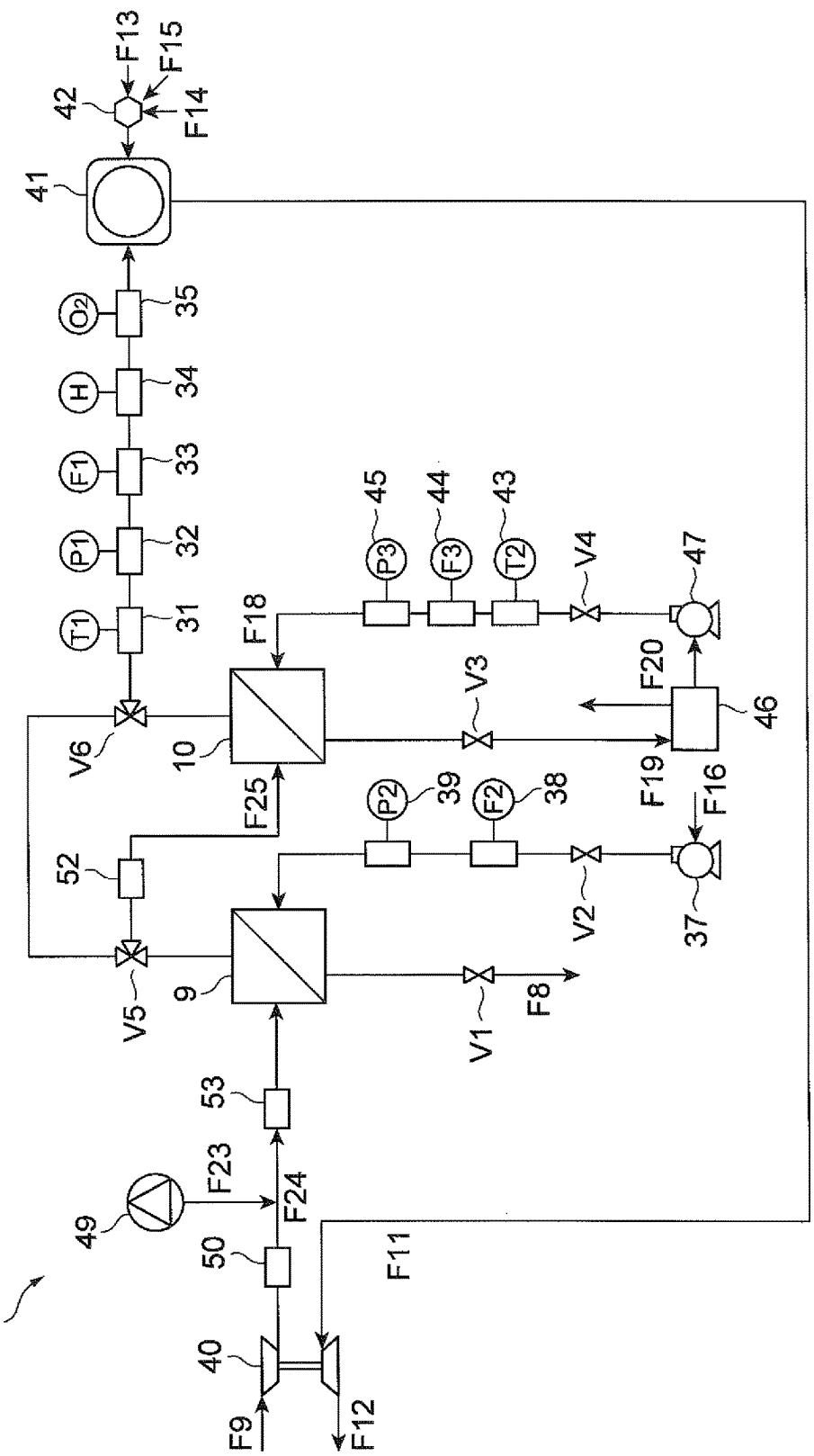
FIG. 11 is a conceptual view of an example of the air supply device for the internal combustion engine of the present embodiment.

FIG. 11 is a conceptual view of another example of the air supply device of the internal combustion engine of the present embodiment. The air supply device 8 is equipped with a first membrane module 9 that mainly performs the nitrogen enrichment on the air, and a second membrane module 10 that mainly performs the humidification on the air. A hollow fiber membrane module or a flat membrane module is employed as each of the membrane modules. Device symbols and arrow symbols identical to those of FIG. 8 have the same description as in FIG. 8. The air nitrogen-enriched by the membrane module 9 is humidified by the membrane module 10, and the humidified air is additionally low-oxygenated and is introduced into a diesel engine 41. The configuration of the air supply device of the present embodiment is sufficient if it includes the aforementioned configuration, and can be appropriately designed depending on applications or usage environments of the internal combustion engine.

Figure 12:
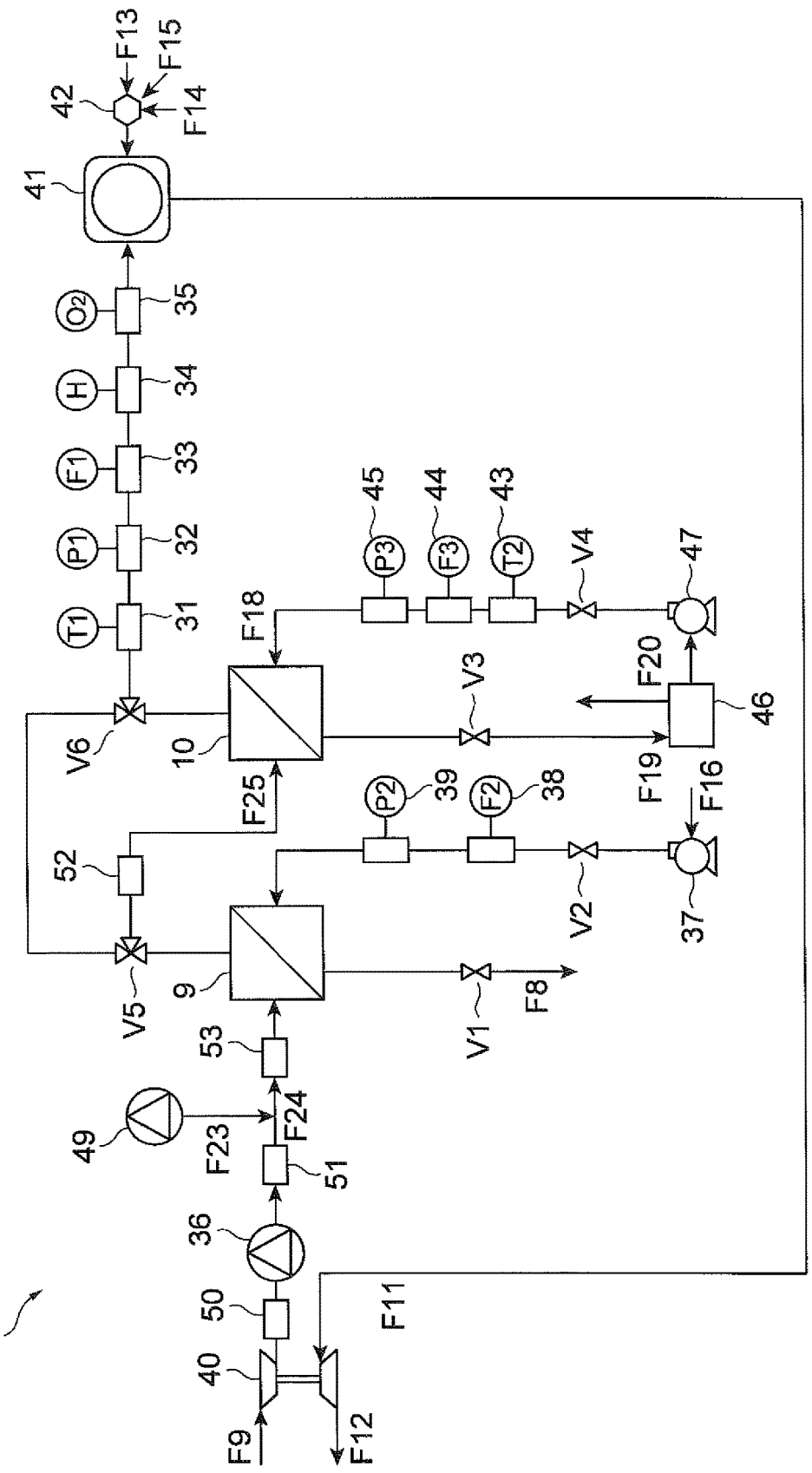
FIG. 12 is a conceptual view of an example of the air supply device for the internal combustion engine of the present embodiment.

FIG. 12 is a conceptual view of another example of the air supply device of the internal combustion engine of the present embodiment. The air supply device 8' is an example in which both an air compressor 36 and an air compressor 49 are used to compensate for an amount of oxygen-enriched air discharged from a membrane module 9.

Supply air used in driving of the internal combustion engine preferably has high supply air balance. Here, the supply air balance refers to a change in the flow rate (m³/min) of the air, which is caused by performing the humidification or the nitrogen enrichment, and is obtained by the following formula.

Supply air balance (%)=(Flow rate of humidified and/or nitrogen-enriched air−Flow rate of supplied air)/Flow rate of supplied air That is, if the flow rate of the air is increased by performing the humidification and/or the nitrogen enrichment, the supply air balance has a positive value. To be specific, in the present embodiment, the supply air balance is preferably −40% or more. The supply air balance is more preferably −15% or more, more preferably −10% or more, more preferably 0% or more, more preferably 10% or more, and most preferably 15% or more. As the supply air balance of the humidified and/or nitrogen-enriched air is set to the above range, energy efficiency can also be further improved.

EXAMPLES

The present embodiment will be described in greater detail using the following examples, but the present embodiment is not limited at all by the following examples.

Examples 1 to 37 and Comparative Examples 1 to 32

As illustrated in FIGS. 8, 11, and 12, each device was connected. Which device the connection was performed on is listed in tables. Further, use of each constituent device in the figures is indicated in the tables by the symbols "○ (connected)" and "× (disconnected)." Further, in the present examples, unless otherwise specified, a pressure is expressed by a gauge pressure.

That is, in FIG. 8, the air supply device 5 is equipped with the first membrane module 9 that mainly performs the nitrogen enrichment on the air, and the second membrane module 10 that mainly performs the humidification on the air. The air nitrogen-enriched by the membrane module 9 is humidified by the membrane module 10, and the humidified air is additionally low-oxygenated and is introduced into the diesel engine 41. The nitrogen-enriched air flowing out of the first membrane module 9 is heated by the heat exchanger 52 as needed, and is introduced into the second membrane module 10.

In FIG. 11, the air supply device 8 is equipped with the first membrane module 9 that mainly performs the nitrogen enrichment on the air, and the second membrane module 10 that mainly performs the humidification on the air. The device symbols and arrow symbols identical to those of FIG. 8 have the same description as in FIG. 8. The air nitrogen-enriched by the first membrane module 9 is humidified by the second membrane module 10, and the humidified air is additionally low-oxygenated and is introduced into the diesel engine 41.

The foregoing also applies to FIG. 12.

Figure 13:
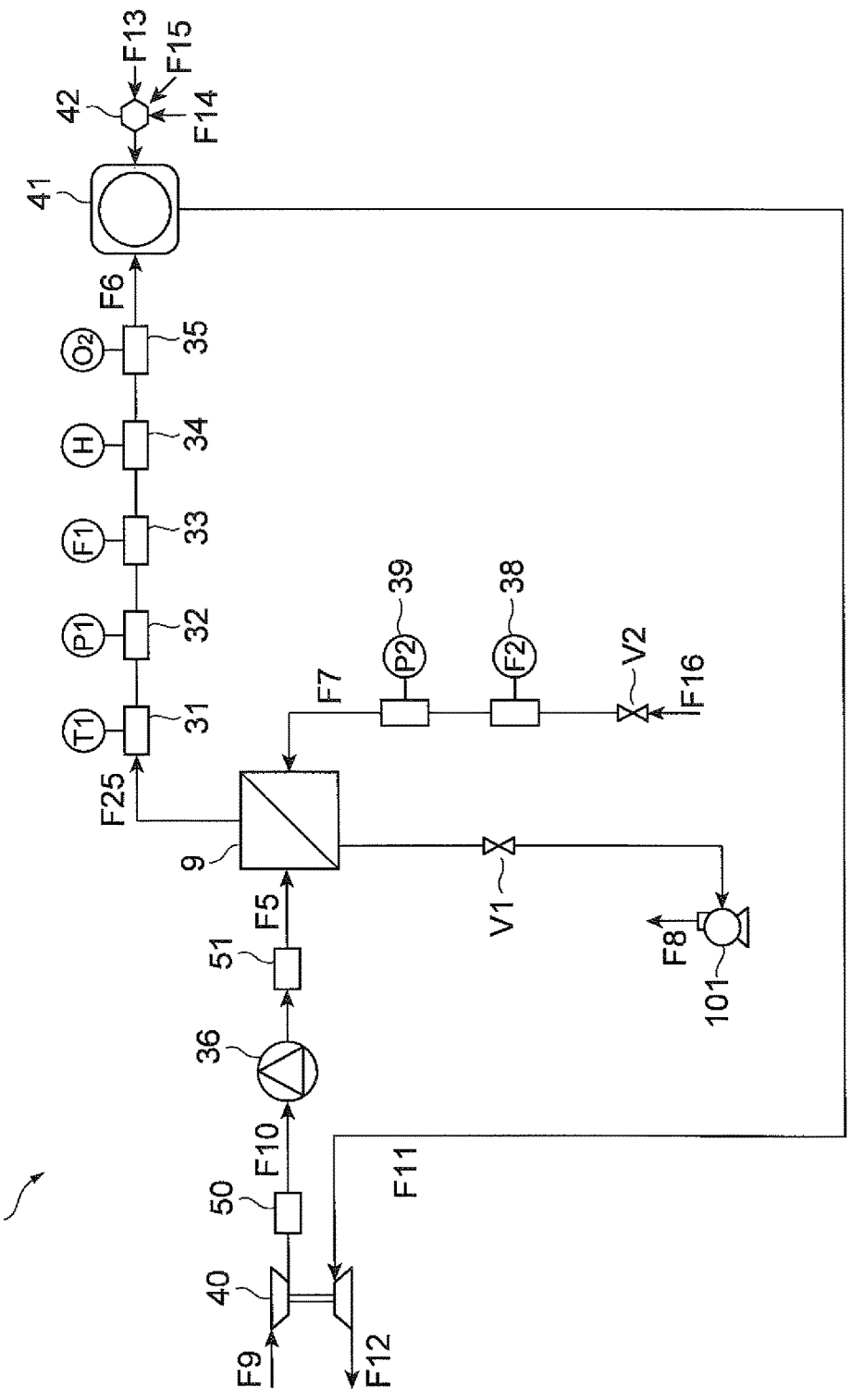
FIG. 13 is a conceptual view of an example of the air supply device for the internal combustion engine of the present embodiment.

In FIG. 13, a reference number 101 indicates a vacuum pump or a suction blower. Other descriptions are the same as those of FIG. 6.

Figure 14:
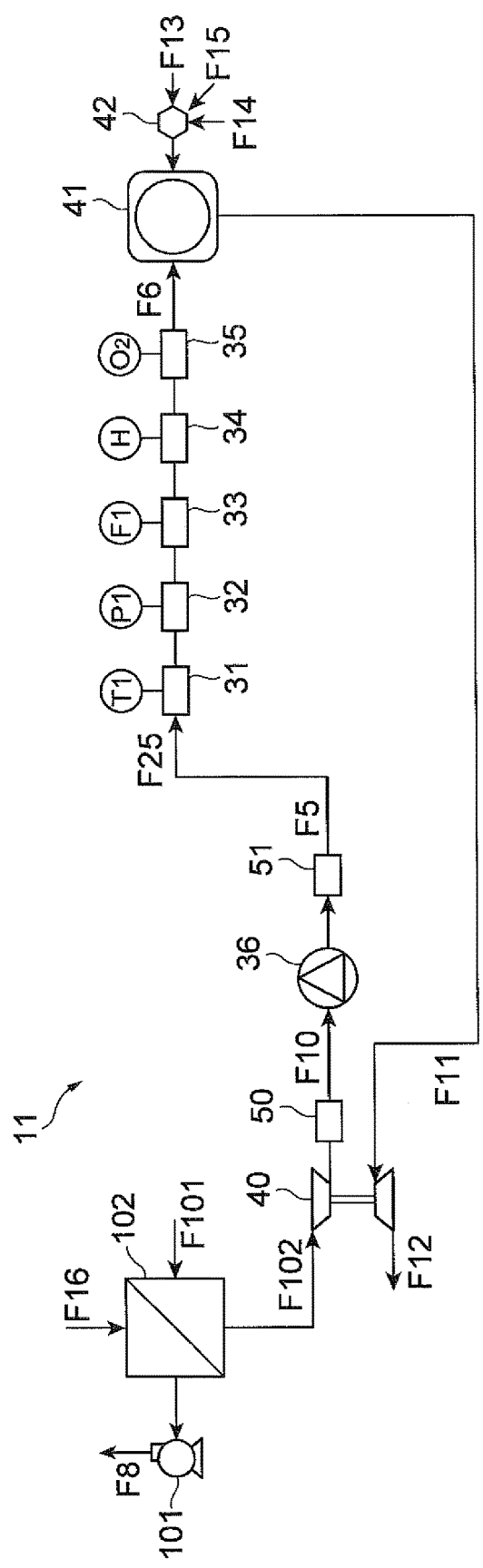
FIG. 14 is a conceptual view of an example of the air supply device for the internal combustion engine of the present embodiment.

In FIG. 14, a reference number 101 indicates a vacuum pump or a suction blower. A reference number 102 indicates a membrane device installed at a suction side of a supercharger. A symbol F16 indicates air, which is introduced as needed. A symbol F8 indicates emissions, and a symbol F101 indicates air. A symbol F102 indicates nitrogen-enriched air. Other descriptions are the same as those of FIG. 6.

Figure 15:
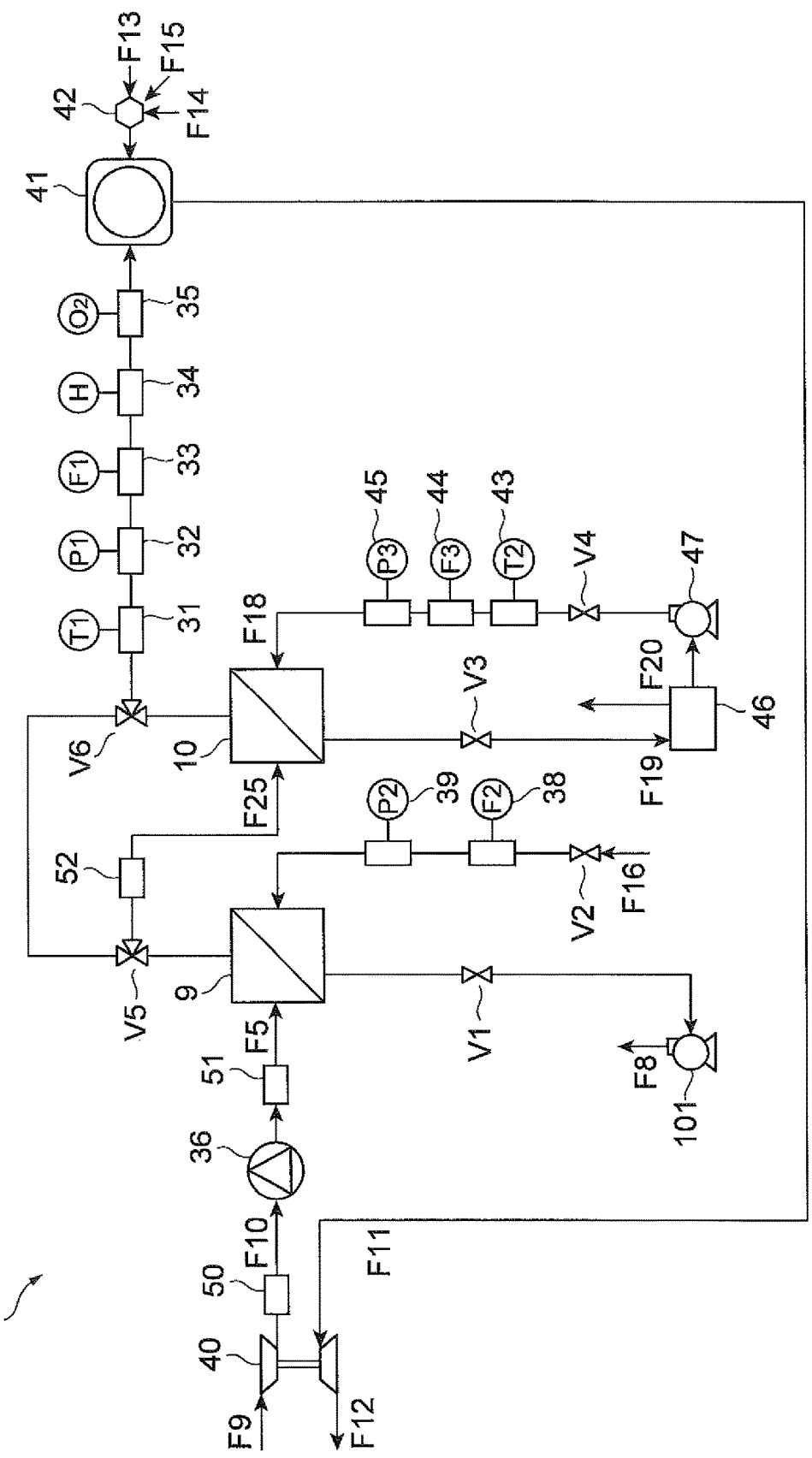
FIG. 15 is a conceptual view of an example of the air supply device for the internal combustion engine of the present embodiment.

In FIG. 15, a reference number 101 indicates a vacuum pump or a suction blower. Other descriptions are the same as those of FIG. 8.

Figure 16:
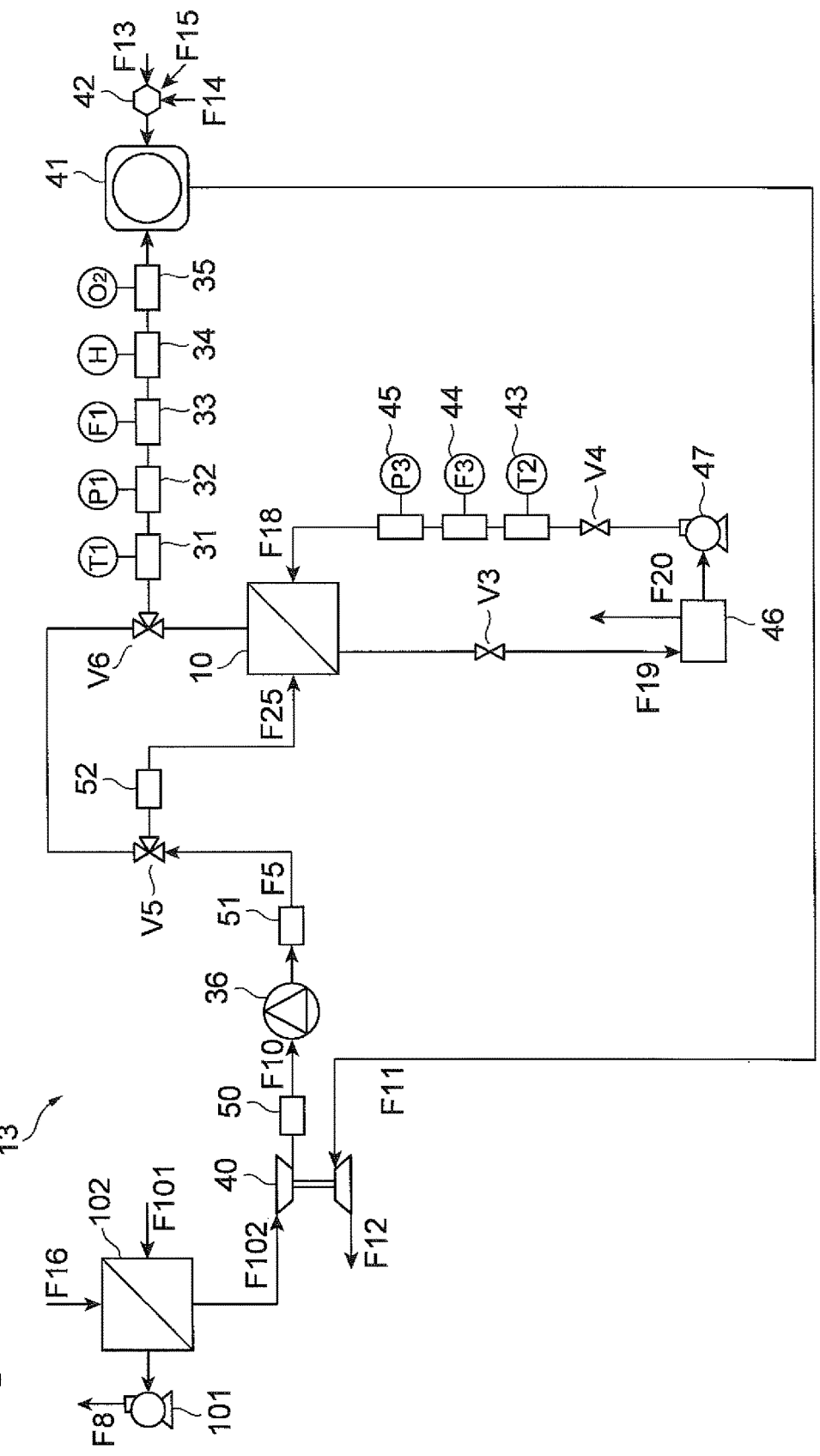
FIG. 16 is a conceptual view of an example of the air supply device for the internal combustion engine of the present embodiment.

In FIG. 16, a reference number 101 indicates a vacuum pump or a suction blower. A reference number 102 indicates a membrane device installed at a suction side of a supercharger. A symbol F16 indicates air, which is introduced as needed. A symbol F8 indicates emissions, and a symbol F101 indicates air. A symbol F102 indicates nitrogen-enriched air. Other descriptions are the same as those of FIG. 8.

Regardless of which device is connected, in Examples 1 to 17 and Comparative Examples 1 to 21, an emulsion fuel was supplied to an engine by injecting a fuel and water into a mixer (Sekiema BF/DND-300HC-ST) through respective meters just before an engine and mixing and emulsifying the fuel and the water. At the time of the emulsification, emulsifiers, 0.3 vol % Sekiemal SA and 0.2 vol % Sekiemal LK, were added to the fuel.

Further, with regard to Examples 18 to 27 and Comparative Example 22 to 28, similar to the foregoing, a fuel emulsified using emulsifiers was used.

Further, with regard to Examples 28 to 37 and Comparative Examples 29 to 32, without using emulsifiers, an emulsion fuel adjusted by mixing light oil and water with no emulsifiers using a static mixer (Ramond Nano Mixer (registered trademark)) available from NANOX Co. Ltd. was used.

In each of the examples and comparative examples, a flat membrane module and a hollow fiber membrane module represented below (a type that was used is shown in Tables together with a number) were used in the first membrane module and the second membrane module of the device of the internal combustion engine of FIG. 8, 11, or 12. In the flat membrane module, a polyethylene microporous membrane (where a mode diameter based on a mercury porosimeter was 90 nm) was used as a support layer, and the polyethylene microporous membrane was cut to a width of 300 mm. Then, only one surface of the polyethylene microporous membrane was coated with "Teflon (registered trademark) AF1600" (available from DuPont Co. Ltd.) so as to have a thickness of 1 μm or less using a microgravure coating machine (available from Yasui Seiki Co. Ltd.), and a gas permeable membrane was obtained.

Next, two spacers were prepared, and the gas permeable membrane was sandwiched between the two spacers. The sandwiched gas permeable membrane was pleated with a pleat height of 60 mm using a pleating machine, and then was cut to a width of 120 mm. Thereby, a pleated laminate having 550 pleat portions (and a length of about 380 mm) was obtained. Ends of the pleated laminate were adhered with an epoxy resin, and a membrane element was obtained. For the spacers, a plain weave fabric made of a plurality of polyester twisted threads, each of which had a diameter of about 126 μm, i.e., a plain weave fabric in which intersections of the threads were fixed by thermal bonding, and had a thickness of 183 μm, an opening (distance between the threads) of 1 mm, and a width of 300 mm was used. The membrane element was charged with one side (primary side) and the other side (secondary side) of the membrane kept airtight such that no gas moved other than through permeation of the membrane, and was used as a flat membrane module. A flat membrane module having an area per one membrane of 7.5 m² (called "flat membrane A") was prepared. Similarly, a flat membrane module having an area per one membrane of 15 m² (called "flat membrane B") was also prepared. The membrane element charged in the membrane module was manufactured by using a polyestersulfone hollow fiber ultrafiltration membrane (UF membrane) having an inner diameter of 0.7 mmφ) and an outer diameter of 10 mmφ as a support layer, coating an outer side of the UF membrane with "Teflon (registered trademark) AF1600" (trade name, and available from DuPont Co. Ltd.) that is a fluororesin so as to have a thickness of 1 μm or less as a gas permeable membrane, and twilling the coated UF membrane around a core rod. The membrane element was shaped of a cylinder having an area per one membrane of 10 m², an outer diameter of 175 mmφ, and a length of 430 mm. Similarly, the membrane element was charged and used as a hollow fiber membrane module. Further, the gas permeable membrane had a water absorption rate of 0.01% or less and a contact angle of 104° when in contact with water. The water absorption rate was measured according to ASTM D570 under the condition that a sample was immersed in water of 23° C. for 24 hours. The contact angle with the water was measured using a contact angle measuring device ("CA-X150 type contact angle meter" available from Kyowa Interface Science Co. Ltd.) after a droplet of deionized water was put on a surface of the sample and was left alone at 23° C. for 1 minute.

In Examples 1 to 17 and Comparative Examples 1 to 21, a 2-stroke low-speed diesel engine, whose specifications included a rated speed of 177 rpm (at 100% load), power of 857 kW, a bore of 400 mm, a stroke of 1360 mm, and a net mean effective pressure (Pme) of 1.7 MPa was used, and A heavy oil was used as a fuel. The engine was driven according to an E3 type test cycle prescribed in "Technical Code (2008) on Control of Emission of NOx from Marine Diesel Engine" (ClassNK [Nippon Kaiji Kyokai]).

Injection timing adjustment was performed by changing a capacity of an injection pump, and was delayed by 4°.

Driving conditions and results of Examples are shown in Table 1, and driving conditions and results of Comparative Examples are shown in Table 2. Tap water was used as water. A concentration of oxygen was measured using a zirconia type oxygen concentration meter, YEW ZR202G+ZR20H, available from Yokogawa Electric Co. Ltd. Humidity was measured using a 6681 type hygrothermograph available from TESTO.

In Examples 18 to 27 and Comparative Examples 22 to 28, a 4-stroke high-speed diesel engine, whose specifications included a rated speed of 2400 rpm (at 100% load), power of 103 kW, a bore of 110 mm, a stroke of 125 mm, and a net mean effective pressure (Pme) of 1.08 MPa was used, and light oil was used as a fuel (called engine 4A). In Examples 28 to 37 and Comparative Examples 29 to 32, another 4-stroke high-speed diesel engine, whose specifications included a rated speed of 3101 rpm (at 100% load), power of 214 kW, a bore of 100 mm, a stroke of 110 mm, and Pme of 1.59 MPa was used, and light oil was used as a fuel (called engine 4B). Driving conditions and results of Examples and Comparative Examples are shown in Tables 1 to 5.

Further, when an air compressor (particularly, an air compressor 49) was used, some supply air from a supercharger and the air compressor was emitted to adjust a pressure, and surging of the supercharger and the air compressor was prevented.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Device corresponding figure | FIG. 8 | FIG. 8 | FIG. 12 | FIG. 12 | FIG. 12 | FIG. 12 | FIG. 12 | FIG. 12 | FIG. 12 |
| Reduction in concentration of oxygen in air by gas permeable membrane | ○ | ○ | ○ | ○ | ○ | ○ | ○ | ○ | ○ |
| Humidification of air by gas permeable membrane | x | x | x | x | ○ | x | ○ | x | x |
| Use of air compressor (36) | ○ | ○ | ○ | ○ | ○ | ○ | ○ | ○ | ○ |
| Use of air compressor (49) | x | x | ○ | ○ | ○ | ○ | ○ | ○ | ○ |
| First membrane module | 56 flat membranes | 42 hollow fiber membranes | 42 hollow fiber membranes | 42 hollow fiber membranes | 42 hollow fiber membranes | 42 hollow fiber membranes | 42 hollow fiber membranes | 56 hollow fiber membranes | 56 hollow fiber membranes |
| Second membrane module | 42 flat membranes | 32 hollow fiber membranes | 32 hollow fiber membranes | 32 hollow fiber membranes | 32 hollow fiber membranes | 32 hollow fiber membranes | 32 hollow fiber membranes | 32 hollow fiber membranes | 32 hollow fiber membranes |
| Content of water in fuel (water/A heavy oil (V/V) | 50/100 | 50/100 | 50/100 | 50/100 | 50/100 | 80/100 | 60/100 | 50/100 | 60/100 |
| Load rate of engine (%) | 70 | 70 | 70 | 70 | 70 | 70 | 70 | 50 | 50 |
| $O_2$ in supply air[mol %] | 19.5 | 19.5 | 19.2 | 19.5 | 18.6 | 19.2 | 180.0 | 19.2 | 19.2 |
| $H_2O$ in supply air[mol %] | 2.0 | 2.0 | 1.9 | 0.7 | 4.3 | 2.1 | 5.7 | 2.0 | 2.0 |
| Membrane device input pressure [kPa] | 150.0 | 151.0 | 183.6 | 198.3 | 200.9 | 134.2 | 194.0 | 132.6 | 134.1 |
| Engine supply air pressure [kPa] | 140.0 | 139.6 | 171.8 | 186.7 | 181.9 | 126.1 | 181.4 | 124.6 | 126.0 |
| Engine supply air temperature [kPa] | 36.9 | 38.6 | 39.8 | 39.0 | 54.5 | 40.4 | 57.7 | 39.1 | 39.8 |
| Amount of NOx in emissions of engine [g/kWh] | 5.95 | 5.96 | 6.22 | 5.08 | 3.23 | 4.62 | 2.65 | 6.95 | 5.84 |
| Consumption rate of fuel [g/kWh] | 198.7 | 198.5 | 197.8 | 201.8 | 204.6 | 199.7 | 208.0 | 203.3 | 207.1 |
| Injection timing adjustment |  |  |  | ○ | ○ |  | ○ |  |  |

TABLE 1-continued

|  | Example 10 | Example 11 | Example 12 | Example 13 | Example 14 | Example 15 | Example 16 | Example 17 |
|---|---|---|---|---|---|---|---|---|
| Device corresponding figure | FIG. 12 | FIG. 12 | FIG. 12 | FIG. 12 | FIG. 12 | FIG. 12 | FIG. 12 | FIG. 12 |
| Reduction in concentration of oxygen in air by gas permeable membrane | ○ | ○ | ○ | ○ | ○ | ○ | ○ | ○ |
| Humidification of air by gas permeable membrane | x | x | x | x | x | x | x | ○ |
| Use of air compressor (36) | ○ | ○ | ○ | ○ | ○ | ○ | ○ | ○ |
| Use of air compressor (49) | ○ | ○ | ○ | ○ | ○ | ○ | ○ | ○ |
| First membrane module | 56 hollow fiber membranes | 56 hollow fiber membranes | 56 hollow fiber membranes | 56 hollow fiber membranes | 56 hollow fiber membranes | 56 hollow fiber membranes | 56 hollow fiber membranes | 56 hollow fiber membranes |
| Second membrane module | 32 hollow fiber membranes | 32 hollow fiber membranes | 32 hollow fiber membranes | 32 hollow fiber membranes | 32 hollow fiber membranes | 32 hollow fiber membranes | 32 hollow fiber membranes | 32 hollow fiber membranes |
| Content of water in fuel (water/A heavy oil (V/V) | 60/100 | 50/100 | 60/100 | 80/100 | 80/100 | 80/100 | 80/100 | 80/100 |
| Load rate of engine (%) | 50 | 25 | 25 | 25 | 25 | 25 | 25 | 25 |
| $O_2$ in supply air[mol %] | 19.2 | 19.5 | 19.6 | 19.9 | 19.7 | 19.7 | 19.7 | 18.7 |
| $H_2O$ in supply air[mol %] | 1.2 | 1.5 | 2.3 | 1.7 | 1.4 | 1.5 | 1.2 | 5.5 |
| Membrane device input pressure [kPa] | 157.9 | 115.5 | 97.1 | 113.2 | 97.7 | 100.4 | 129.1 | 127.5 |
| Engine supply air pressure [kPa] | 148.9 | 93.6 | 90.0 | 105.0 | 84.7 | 93.5 | 121.1 | 113.1 |
| Engine supply air temperature [kPa] | 39.1 | 43.8 | 39.6 | 38.9 | 43.9 | 43.4 | 39.1 | 54.5 |
| Amount of NO$x$ in emissions of engine [g/kWh] | 4.13 | 12.87 | 11.05 | 6.70 | 8.09 | 7.88 | 4.35 | 2.60 |
| Consumption rate of fuel [g/kWh] | 208.8 | 220.0 | 214.4 | 217.3 | 220.6 | 219.3 | 220.3 | 223.3 |
| Injection timing adjustment | ○ |  |  |  |  |  | ○ | ○ |

TABLE 2

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Device corresponding | FIG. 8 | FIG. 12 | FIG. 12 | FIG. 12 | FIG. 8 | FIG. 8 | FIG. 12 | FIG. 12 |
| Reduction in concentration of oxygen in air by gas permeable membrane | x | ○ | ○ | x | x | x | x | x |
| Humidification of air by gas permeable membrane | x | x | ○ | x | x | x | x | ○ |
| Use of air compressor (36) | ○ | ○ | ○ | ○ | ○ | ○ | ○ | ○ |
| Use of air compressor (49) | x | ○ | ○ | x | x | x | ○ | ○ |
| First membrane module | 56 flat membranes | 42 hollow fiber membranes | 42 hollow fiber membranes |  |  |  | 42 hollow fiber membranes | 42 hollow fiber membranes |
| Second membrane module | 42 flat membranes | 32 hollow fiber membranes | 32 hollow fiber membranes |  |  |  | 32 hollow fiber membranes | 32 hollow fiber membranes |
| Content of water in fuel (water/A heavy oil (V/V) | 0/100 | 0/100 | 0/100 | 0/100 | 0/100 | 50/100 | 50/100 | 50/100 |
| Load rate of engine (%) | 70 | 70 | 70 | 70 | 70 | 70 | 70 | 70 |
| $O_2$ in supply air[mol %] | 20.9 | 19.1 | 18.0 | 20.9 | 20.9 | 20.9 | 21.1 | 20.4 |
| $H_2O$ in supply air[mol %] | 0.0 | 0.9 | 5.7 | 0.0 | 0.0 | 0.0 | 0.9 | 4.2 |
| Membrane device input pressure[kPa] |  | 213.6 | 185.6 |  |  |  | 195.6 | 200.7 |
| Engine supply air pressure[kPa] | 156.2 | 201.7 | 166.1 | 173.6 | 178.5 | 164.8 | 185.1 | 183.0 |
| Engine supply air temperature[kPa] | 34.3 | 36.1 | 57.7 | 38.1 | 33.8 | 38.7 | 37.8 | 54.6 |
| Amount of NO$x$ in emissions of engine[g/kWh] | 14.80 | 9.16 | 5.07 | 15.58 | 12.76 | 10.56 | 9.22 | 7.26 |

TABLE 2-continued

| | | | | | | | |
|---|---|---|---|---|---|---|---|
| Consumption rate of fuel[g/kWh] | 217.3 | 192.2 | 211.0 | 197.5 | 195.8 | 200.8 | 202.9 | 207.3 |
| Injection timing adjustment | | | | ○ | | ○ | ○ | ○ |

| | Comparative Example 9 | Comparative Example 10 | Comparative Example 11 | Comparative Example 12 | Comparative Example 13 | Comparative Example 14 | Comparative Example 15 |
|---|---|---|---|---|---|---|---|
| Device corresponding | FIG. 8 | FIG. 8 | FIG. 8 | FIG. 8 | FIG. 8 | FIG. 8 | FIG. 8 |
| Reduction in concentration of oxygen in air by gas permeable membrane | x | x | x | x | x | x | x |
| Humidification of air by gas permeable membrane | x | x | x | x | x | x | x |
| Use of air compressor (36) | ○ | ○ | ○ | ○ | ○ | ○ | ○ |
| Use of air compressor (49) | x | x | x | x | x | x | x |
| First membrane module | | | | | | | |
| Second membrane module | | | | | | | |
| Content of water in fuel (water/A heavy oil (V/V) | 60/100 | 0/100 | 0/100 | 50/100 | 60/100 | 0/100 | 0/100 |
| Load rate of engine (%) | 70 | 50 | 50 | 50 | 50 | 25 | 25 |
| $O_2$ in supply air[mol %] | 20.9 | 20.9 | 20.9 | 20.9 | 20.9 | 20.9 | 20.9 |
| $H_2O$ in supply air[mol %] | 0.0 | 0.0 | 0.0 | 0.0 | 0.0 | 0.0 | 0.0 |
| Membrane device input pressure[kPa] | | | | | | | |
| Engine supply air pressure[kPa] | 171.6 | 108.9 | 111.8 | 105.9 | 122.6 | 48.1 | 53.9 |
| Engine supply air temperature[kPa] | 40.2 | 38.5 | 37.7 | 39.0 | 37.6 | 37.2 | 36.0 |
| Amount of NO$x$ in emissions of engine[g/kWh] | 9.27 | 15.37 | 15.66 | 11.76 | 8.97 | 21.19 | 15.87 |
| Consumption rate of fuel[g/kWh] | 199.7 | 206.3 | 214.7 | 207.6 | 214.3 | 217.4 | 226.2 |
| Injection timing adjustment | | | ○ | | ○ | | ○ |

| | Comparative Example 16 | Comparative Example 17 | Comparative Example 18 | Comparative Example 19 | Comparative Example 20 | Comparative Example 21 |
|---|---|---|---|---|---|---|
| Device corresponding | FIG. 12 | FIG. 12 | FIG. 8 | FIG. 8 | FIG. 8 | FIG. 12 |
| Reduction in concentration of oxygen in air by gas permeable membrane | ○ | x | x | x | x | x |
| Humidification of air by gas permeable membrane | x | x | x | x | x | ○ |
| Use of air compressor (36) | ○ | ○ | ○ | ○ | ○ | ○ |
| Use of air compressor (49) | ○ | ○ | x | x | x | ○ |
| First membrane module | 56 hollow fiber membranes | 56 hollow fiber membranes | | | | 56 hollow fiber membranes |
| Second membrane module | 32 hollow fiber membranes | 32 hollow fiber membranes | | | | 32 hollow fiber membranes |
| Content of water in fuel (water/A heavy oil (V/V) | 0/100 | 0/100 | 50/100 | 80/100 | 80/100 | 80/100 |
| Load rate of engine (%) | 25 | 25 | 25 | 25 | 25 | 25 |
| $O_2$ in supply air[mol %] | 19.5 | 20.9 | 20.9 | 20.9 | 20.9 | 20.2 |
| $H_2O$ in supply air[mol %] | 1.6 | 1.9 | 0.0 | 0.0 | 0.0 | 5.4 |
| Membrane device input pressure[kPa] | 129.7 | 130.8 | | | | 129.5 |
| Engine supply air pressure[kPa] | 121.7 | 123.7 | 47.1 | 46.1 | 50.0 | 115.8 |
| Engine supply air temperature[kPa] | 38.1 | 38.1 | 36.5 | 27.5 | 34.9 | 54.9 |
| Amount of NO$x$ in emissions of engine[g/kWh] | 10.41 | 18.09 | 18.72 | 12.85 | 10.83 | 5.27 |
| Consumption rate of fuel[g/kWh] | 215.3 | 213.9 | 220.9 | 221.3 | 221.0 | 220.6 |
| Injection timing adjustment | ○ | ○ | | | ○ | ○ |

TABLE 3

|  | Example 18 | Comparative Example 22 |
|---|---|---|
| Device corresponding figure | FIG. 12 | FIG. 12 |
| Reduction in concentration of oxygen in air by gas permeable membrane | ○ | x |
| Humidification of air by gas permeable membrane | x | x |
| Use of air compressor (36) | x | x |
| Use of air compressor (49) | ○ | x |
| First membrane module | 8 flat membranes A | 8 flat membranes A |
| Second membrane module | 4 hollow fiber membranes | 4 hollow fiber membranes |
| Content of water in fuel (water/light oil (wt/wt) | 40/60 | 0/100 |
| Load rate of engine[%] | 50 | 50 |
| $O_2$ in supply air[mol %] | 20.0 | 20.9 |
| $H_2O$ in supply air[mol %] | 0.0 | 0.0 |
| Membrane device input pressure[kPa] | 88.0 | |
| Engine supply air pressure[kPa] | 75.0 | 75.0 |
| Engine supply air temperature | 40.0 | 40.0 |
| Amount of NOx in emissions of engine[g/kWh] | 4.50 | 11.67 |
| Consumption rate of fuel[g/kWh] | 12.67 | 11.35 |
| Engine used | 4A | 4A |

TABLE 4

|  | Example 19 | Example 20 | Example 21 | Example 22 | Example 23 | Example 24 | Example 25 | Example 26 |
|---|---|---|---|---|---|---|---|---|
| Device corresponding figure | FIG. 12 | FIG. 12 | FIG. 12 | FIG. 12 | FIG. 12 | FIG. 12 | FIG. 12 | FIG. 12 |
| Reduction in concentration of oxygen in air by gas permeable membrane | ○ | ○ | ○ | ○ | ○ | ○ | ○ | ○ |
| Humidification of air by gas permeable | x | x | x | x | x | x | x | x |
| Use of air compressor (36) | x | x | x | x | x | x | x | x |
| Use of air compressor (49) | ○ | ○ | ○ | ○ | ○ | ○ | ○ | ○ |
| First membrane module | 8 flat membranes A | 8 flat membranes A | 8 flat membranes A | 8 flat membranes A | 8 flat membranes A | 8 flat membranes A | 8 flat membranes A | 8 flat membranes A |
| Second membrane module | 4 hollow fiber membranes | 4 hollow fiber membranes | 4 hollow fiber membranes | 4 hollow fiber membranes | 4 hollow fiber membranes | 4 hollow fiber membranes | 4 hollow fiber membranes | 4 hollow fiber membranes |
| Content of water in fuel (water/light oil(wt/wt) | 13.8/86.2 | 27.4/72.6 | 38.1/61.9 | 21.7/78.3 | 29.1/70.9 | 42.0/58.0 | 21.1/78.9 | 35.2/64.8 |
| Load rate of engine[%] | 75 | 75 | 75 | 50 | 50 | 50 | 25 | 25 |
| $O_2$ in supply air[mol %] | 19.0 | 19.0 | 19.0 | 19.0 | 19.0 | 19.0 | 19.0 | 19.0 |
| $H_2O$ in supply air[mol %] | 0.0 | 0.0 | 0.0 | 0.0 | 0.0 | 0.0 | 0.0 | 0.0 |
| Membrane device input pressure[kPa] | 200.0 | 200.0 | 200.0 | 200.0 | 200.0 | 200.0 | 200.0 | 200 |
| Engine supply air pressure[kPa] | 80.0 | 80.0 | 80.0 | 75.0 | 75.0 | 75.0 | 65.0 | 65.0 |
| Engine supply air temperature | 40.0 | 40.0 | 40.0 | 40.0 | 40.0 | 40.0 | 40.0 | 40.0 |
| Amount of NOx in emissions of engine [g/kWh] | 5.49 | 4.33 | 2.94 | 4.75 | 4.03 | 2.10 | 4.86 | 3.11 |
| Consumption rate of fuel [%]*) | 100.0 | 100.0 | 100.0 | 100 | 100 | 100 | 100.0 | 100.0 |
| Engine used | 4A | 4A | 4A | 4A | 4A | 4A | 4A | 4A |

|  | Example 27 | Comparative Example 23 | Comparative Example 24 | Comparative Example 25 | Comparative Example 26 | Comparative Example 27 | Comparative Example 28 |
|---|---|---|---|---|---|---|---|
| Device corresponding figure | FIG. 12 | FIG. 12 | FIG. 12 | FIG. 12 | FIG. 12 | FIG. 12 | FIG. 12 |
| Reduction in concentration of oxygen in air by gas permeable membrane | ○ | x | ○ | x | ○ | x | ○ |
| Humidification of air by gas permeable | x | x | x | x | x | x | x |
| Use of air compressor (36) | x | x | x | x | x | x | x |
| Use of air compressor (49) | ○ | ○ | ○ | ○ | ○ | ○ | ○ |
| First membrane module | 8 flat membranes A | 8 flat membranes A | 8 flat membranes A | 8 flat membranes A | 8 flat membranes A | 8 flat membranes A | 8 flat membranes A |
| Second membrane module | 4 hollow fiber membranes | 4 hollow fiber membranes | 4 hollow fiber membranes | 4 hollow fiber membranes | 4 hollow fiber membranes | 4 hollow fiber membranes | 4 hollow fiber membranes |

TABLE 4-continued

|  |  |  |  |  |  |  |  |
|---|---|---|---|---|---|---|---|
| Content of water in fuel (water/light oil(wt/wt) | 39.4/60.6 | 0/100 | 0/100 | 0/100 | 0/100 | 0/100 | 0/100 |
| Load rate of engine[%] | 25 | 75 | 75 | 50 | 50 | 25 | 25 |
| $O_2$ in supply air[mol %] | 19.0 | 20.9 | 19.0 | 20.9 | 19.0 | 20.9 | 19.0 |
| $H_2O$ in supply air[mol %] | 0.0 | 0.0 | 0.0 | 0.0 | 0.0 | 0.0 | 0.0 |
| Membrane device input pressure[kPa] | 200.0 | 200.0 | 200.0 | 200.0 | 200.0 | 200.0 | 200.0 |
| Engine supply air pressure[kPa] | 65.0 | 80.0 | 80.0 | 75.0 | 75.0 | 65.0 | 65.0 |
| Engine supply air temperature | 40.0 | 40.0 | 40.0 | 40.0 | 40.0 | 40.0 | 40.0 |
| Amount of NOx in emissions of engine [g/kWh] | 1.96 | 12.31 | 6.03 | 11.74 | 5.65 | 11.80 | 6.05 |
| Consumption rate of fuel [%]*) | 100.0 | 100.0 | 100.0 | 100 | 100 | 100 | 100 |
| Engine used | 4A | 4A | 4A | 4A | 4A | 4A | 4A |

*)relative value (%) of light oil (no addition of water) at each load when based on a consumption rate of fuel [g/kWh] when a concentration of O2 in supply air is 20.9 mol %

TABLE 5

|  | Example 28 | Example 29 | Example 30 | Example 31 | Examples 32 | Example 33 | Example 34 | Example 35 |
|---|---|---|---|---|---|---|---|---|
| Device corresponding figure | FIG. 12 | FIG. 12 | FIG. 12 | FIG. 12 | FIG. 12 | FIG. 12 | FIG. 12 | FIG. 12 |
| Reduction in concentration of oxygen in air by gas permeable membrane | ○ | ○ | ○ | ○ | ○ | ○ | ○ | ○ |
| Humidification of air by gas permeable | x | x | x | x | x | x | x | x |
| Use of air compressor (36) | x | x | x | x | x | x | x | x |
| Use of air compressor (49) | ○ | ○ | ○ | ○ | ○ | ○ | ○ | ○ |
| First membrane module | 8 flat membranes B | 8 flat membranes B | 8 flat membranes B | 8 flat membranes B | 8 flat membranes B | 8 flat membranes B | 8 flat membranes B | 8 flat membranes B |
| Second membrane module | 4 flat membranes B | 4 flat membranes B | 4 flat membranes B | 4 flat membranes B | 4 flat membranes B | 4 flat membranes B | 4 flat membranes B | 4 flat membranes B |
| Content of water in fuel (water/light oil (wt/wt) | 8.8/91.2 | 20.2/79.8 | 30.0/70.0 | 20.2/79.8 | 30.0/70.0 | 20.9/79.1 | 25.7/74.3 | 20.0/80.0 |
| Load rate of engine (%) | 75 | 75 | 75 | 75 | 75 | 50 | 50 | 50 |
| $O_2$ in supply air [mol %] | 20.2 | 20.2 | 20.2 | 19.7 | 20.0 | 19.5 | 19.5 | 19.5 |
| $H_2O$ in supply air [mol %] | 0.0 | 0.0 | 0.0 | 0.0 | 0.0 | 0.0 | 0.0 | 0.0 |
| Membrane device input pressure [kPa] | 105.7 | 105.7 | 105.7 | 200.0 | 200.0 | 94.7 | 94.7 | 200.0 |
| Engine supply air pressure [kPa] | 102.7 | 102.7 | 102.7 | 80.0 | 80.0 | 76.5 | 76.5 | 80.0 |
| Engine supply air temperature | 40.0 | 40.0 | 40.0 | 40.0 | 40.0 | 40.0 | 40.0 | 40.0 |
| Amount of NOx in emissions of engine [g/kWh] | 3.35 | 2.63 | 1.84 | 1.28 | 1.30 | 2.89 | 2.68 | 3.53 |
| Consumption rate of fuel [%]*) | 98.0 | 98.0 | 99.0 | 99.0 | 99.0 | 98.3 | 98.3 | 98.3 |
| Engine used | 4B | 4B | 4B | 4B | 4B | 4B | 4B | 4B |

|  |  | Example 36 | Example 37 | Comparative Example 29 | Comparative Example 30 | Comparative Example 31 | Comparative Example 32 |
|---|---|---|---|---|---|---|---|
|  | Device corresponding figure | FIG. 12 | FIG. 12 | FIG. 12 | FIG. 12 | FIG. 12 | FIG. 12 |
|  | Reduction in concentration of oxygen in air by gas permeable membrane | ○ | ○ | x | ○ | x | ○ |
|  | Humidification of air by gas permeable | x | x | x | x | x | x |
|  | Use of air compressor (36) | x | x | x | x | x | x |
|  | Use of air compressor (49) | ○ | ○ | ○ | ○ | ○ | ○ |
|  | First membrane module | 8 flat membranes B | 8 flat membranes B | 8 flat membranes B | 8 flat membranes B | 8 flat membranes B | 8 flat membranes B |

TABLE 5-continued

| | | | | | | |
|---|---|---|---|---|---|---|
| Second membrane module | 4 flat membranes B | 4 flat membranes B | 4 flat membranes B | 4 flat membranes B | 4 flat membranes B | 4 flat membranes B |
| Content of water in fuel (water/light oil (wt/wt) | 20.0/80.0 | 30.0/70.0 | 0/100 | 0/100 | 0/100 | 0/100 |
| Load rate of engine (%) | 50 | 50 | 75 | 75 | 50 | 50 |
| $O_2$ in supply air [mol %] | 19.0 | 19.5 | 20.9 | 20.2 | 20.9 | 19.5 |
| $H_2O$ in supply air [mol %] | 0.0 | 0.0 | 0.0 | 0.0 | 0.0 | 0.0 |
| Membrane device input pressure [kPa] | 200.0 | 200.0 | 106.0 | 105.7 | 96.0 | 94.7 |
| Engine supply air pressure [kPa] | 80.0 | 80.0 | 103.0 | 102.7 | 77.0 | 76.5 |
| Engine supply air temperature | 40.0 | 40.0 | 40.0 | 40.0 | 40.0 | 40.0 |
| Amount of NO$x$ in emissions of engine [g/kWh] | 2.18 | 2.04 | 5.71 | 4.18 | 6.22 | 3.34 |
| Consumption rate of fuel [%]*) | 98.3 | 98.3 | 100 | 100 | 100 | 100 |
| Engine used | 4B | 4B | 4B | 4B | 4B | 4B |

*)relative value (%) of light oil (no addition of water) at each load when based on a consumption rate of fuel [g/kWh] when a concentration of O2 in supply air is 20.9 mol %

It was ascertained from the foregoing that, in each of Examples, the nitrogen oxides in the exhaust gas of the internal combustion engine could be reduced in a simple and effective way. Further, it was also ascertained that a rise in the fuel consumption rate was also effectively suppressed. Further, it was also ascertained that the combination of the air compressor could be effective in both the reduction of the nitrogen oxides and the suppression of the fuel consumption rate.

REFERENCE SIGNS LIST

1 . . . membrane module, 2 . . . membrane module, 3 . . . air supply device, 4 . . . air supply device, 5 . . . air supply device, 6 . . . air supply device, 7 . . . air supply device, 8 . . . air supply device, 8' . . . air supply device, 9 . . . membrane module, 10 . . . membrane module, 11 . . . gas permeable membrane, 12 . . . case, 21 . . . gas permeable membrane, 22 . . . case, 31 . . . thermometer, 32 . . . pressure gauge, 33 . . . flowmeter, 34 . . . hygrometer, 35 . . . oxygen concentration meter, 36 . . . air compressor, 37 . . . air supply blower, 38 . . . flowmeter, 39 . . . pressure gauge, 40 . . . supercharger, 41 . . . diesel engine, 43 . . . thermometer, 44 . . . flowmeter, 45 . . . pressure gauge, 46 . . . hot water bath, 47 . . . pump, 49 . . . air compressor, 50 . . . intercooler, 51 . . . intercooler, 52 . . . heat exchanger, 121 . . . air supply port, 122 . . . air discharge port, 123 . . . air and/or humidifying water supply port, 124 . . . air and/or humidifying water discharge port, 221 . . . air supply port, 222 . . . air discharge port, 223 . . . air and/or humidifying water supply port, 224 . . . air and/or humidifying water discharge port, a1 . . . first space, a2 . . . first space, b1 . . . second space, b2 . . . second space, α . . . membrane module, α1 . . . gas permeable membrane, β . . . membrane module, β1 . . . gas permeable membrane, γ . . . membrane module, γ1 . . . gas permeable membrane

The invention claimed is:

1. A method for driving an internal combustion engine that burns a hydrocarbon fuel and air in a combustion chamber, the method comprising:
reducing a concentration of oxygen in air to be introduced into the combustion chamber as supply air, wherein the reducing is carried out without humidifying, and comprises bringing the air into contact with a surface of a gas permeable membrane;
introducing the supply air into the combustion chamber, wherein the supply air contains no emissions of the internal combustion engine;
mixing water with hydrocarbon fuel; and
injecting a mixture of the hydrocarbon fuel and water into the combustion chamber as an emulsion.

2. The method for driving an internal combustion engine according to claim 1, wherein the surface that is contacted by the air is located on a primary side of the gas permeable membrane, opposite a secondary side, and wherein the reducing of the concentration of oxygen in the air includes:
pressurizing the air to be introduced into the combustion chamber.

3. The method for driving an internal combustion engine according to claim 2, wherein the pressurizing of the air comprises compressing the air by a supercharger attached to the internal combustion engine, and additionally compressing the air by a compressor disposed in series with the supercharger.

4. The method for driving an internal combustion engine according to claim 2, wherein the pressurizing of the air comprises compressing the air by a supercharger attached to the internal combustion engine and compressing the air by a compressor disposed in parallel with the supercharger.

5. The method for driving an internal combustion engine according claim 1, wherein the concentration of oxygen in the air after reducing the concentration of oxygen, is 10 mol % or more and 20.5 mol % or less.

6. The method for driving an internal combustion engine according to claim 1, further comprising:
supplying the air after the reducing of the concentration of oxygen to a supercharger of the internal combustion engine.

7. The method for driving an internal combustion engine according to claim 1, wherein the surface which is contacted by the air is located on a primary side of the gas permeable membrane, opposite a secondary side, the method further comprising:
reducing a total pressure of the secondary side of the gas permeable membrane by a vacuum pump or a suction blower to obtain a lower pressure on the secondary side than on the primary side of the gas permeable membrane.

8. The method for driving an internal combustion engine according to claim 7, wherein the secondary side of the gas permeable membrane is oxygen-enriched by the gas permeable membrane, the method further comprising sweeping the secondary side with a gas.

9. The method for driving an internal combustion engine according to claim 1, wherein the surface that is contacted by the air is located on a primary side of the gas permeable membrane, opposite a secondary side that is oxygen-enriched by the gas permeable membrane, and wherein the reducing of the concentration of oxygen in the air comprises sweeping a surface on the secondary side of the gas permeable membrane with a gas.

10. The method for driving an internal combustion engine according to claim 1, wherein the emulsion contains no emulsifier.

11. The method for driving an internal combustion engine according to claim 1, further comprising:
carrying out gas separation by the gas permeable membrane, through dissolution and diffusion of the air that is brought into contact with the gas permeable membrane.

12. An air supply device for an internal combustion engine comprising:
a supercharger for compressing air;
an air compressor for compressing the air having been compressed by the supercharger to obtain pressurized air;
an oxygen concentration reduction module including a gas permeable membrane housed in a case, the oxygen concentration reduction module being configured to reduce a concentration of oxygen in the pressurized air without humidifying, by bringing the pressurized air into contact with a surface of the gas permeable membrane, to obtain low oxygen concentration air to be supplied to the combustion chamber of the internal combustion engine; and
a mixer for mixing and emulsifying a hydrocarbon fuel and water, in order to supply the fuel and water having been emulsified to the combustion chamber of the internal combustion engine;
wherein the supercharger, the air compressor, and the oxygen concentration reduction module are connected in series.

13. The air supply device according to claim 12, wherein the surface which is contacted by the air is located on a nitrogen-enriched side of the gas permeable membrane, opposite an oxygen-enriched side, the air supply device further comprising: a vacuum pump or a suction blower configured to reduce a total pressure of the oxygen-enriched side of the gas permeable membrane to be lower than a total pressure of the nitrogen-enriched side of the gas permeable membrane.

14. The air supply device according to claim 12, wherein the gas permeable membrane comprises an oxygen-enriched side located opposite the surface which is contacted by the air, and wherein the air supply device is configured to sweep the oxygen-enriched side of the gas permeable membrane with a gas.

15. The air supply device according to claim 12, wherein the gas permeable membrane comprises a hollow fiber membrane or a flat membrane.

16. The air supply device according to claim 12, wherein the oxygen concentration reduction module comprises a vacuum pump or a suction blower at one side of the gas permeable membrane.

17. An air supply device for an internal combustion engine comprising:
a supercharger for compressing air;
an air compressor for compressing the air having been compressed by the supercharger to obtain pressurized air;
an oxygen concentration reduction module including a gas permeable membrane housed in a case, the oxygen concentration reduction module being configured to reduce a concentration of oxygen in the pressurized air without humidifying, by bringing the pressurized air into contact with a surface of the gas permeable membrane, to obtain low oxygen concentration air to be supplied to the combustion chamber of the internal combustion engine; and
a mixer for mixing and emulsifying hydrocarbon fuel and water, in order to supply the fuel and water having been emulsified to the combustion chamber of the internal combustion engine;
wherein the supercharger and the oxygen concentration reduction module are connected in series, and the air compressor is connected in parallel with the supercharger between the supercharger and the oxygen concentration reduction module.

18. The air supply device according to claim 17, wherein the surface which is contacted by the air is located on a nitrogen-enriched side of the gas permeable membrane, opposite an oxygen-enriched side, the air supply device further comprising: a vacuum pump or a suction blower configured to reduce total pressure of the oxygen-enriched side of the gas permeable membrane to be lower than a total pressure of the nitrogen-enriched side of the gas permeable membrane.

19. The air supply device according to claim 17, wherein the gas permeable membrane comprises an oxygen-enriched side located opposite the surface which is contacted by the air, and wherein the air supply device is configured to sweep the oxygen-enriched side of the gas permeable membrane with a gas.

20. The air supply device according to claim 17, wherein the oxygen concentration reduction module comprises a vacuum pump or a suction blower at one side of the gas permeable membrane.

21. An air supply device for an internal combustion engine comprising:
a supercharger for compressing air to obtain pressurized air; and
an oxygen concentration reduction module including a gas permeable membrane housed in a case, the oxygen concentration reduction module being configured to reduce a concentration of oxygen in the pressurized air without humidifying, by bringing the pressurized air into contact with a surface of the gas permeable membrane, to obtain low oxygen concentration air to be supplied to the combustion chamber of the internal combustion engine; and
a mixer for mixing and emulsifying hydrocarbon fuel and water, in order to supply the fuel and the water having been mixed and emulsified to the combustion chamber of the internal combustion engine;
wherein the oxygen concentration reduction module and the supercharger are connected in series.

22. The air supply device according to claim 21, wherein the air supply device includes a compressor configured to increase pressure of the air upstream from the oxygen concentration reduction module.

23. The air supply device according to claim 21, wherein the surface which is contacted by the air is located on a nitrogen-enriched side of the gas permeable membrane, opposite an oxygen-enriched side, the air supply device further comprising: a vacuum pump or a suction blower configured to reduce a total pressure of an oxygen-enriched side of the gas permeable membrane to be lower than a total pressure of the nitrogen-enriched side of the gas permeable membrane.

24. The air supply device according to claim 21, wherein the gas permeable membrane comprises an oxygen-enriched side located opposite the surface which is contacted by the air, and wherein the air supply device is configured to sweep the oxygen-enriched side of the gas permeable membrane with a gas.

25. The air supply device according to claim 21, wherein the oxygen concentration reduction module comprises a vacuum pump or a suction blower at one side of the gas permeable membrane.

* * * * *